(12) United States Patent
Laberge et al.

(10) Patent No.: US 11,130,539 B2
(45) Date of Patent: Sep. 28, 2021

(54) VEHICLE WITH UPPER AND LOWER FRAME PORTIONS

(71) Applicant: BOMBARDIER RECREATIONAL PRODUCTS INC., Valcourt (CA)

(72) Inventors: Nicolas Laberge, Valcourt (CA); Emile Maltais-Larouche, Valcourt (CA); Andre Cote, Sherbrooke (CA); Sebastien Lavoie, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 43 days.

(21) Appl. No.: 16/612,920

(22) PCT Filed: May 8, 2018

(86) PCT No.: PCT/IB2018/053211
§ 371 (c)(1),
(2) Date: Nov. 12, 2019

(87) PCT Pub. No.: WO2018/207104
PCT Pub. Date: Nov. 15, 2018

(65) Prior Publication Data
US 2020/0164943 A1 May 28, 2020

Related U.S. Application Data

(60) Provisional application No. 62/505,167, filed on May 12, 2017.

(51) Int. Cl.
*B62K 5/06* (2006.01)
*B62K 5/027* (2013.01)
(Continued)

(52) U.S. Cl.
CPC .............. *B62K 5/06* (2013.01); *B62K 5/027* (2013.01); *B62K 5/05* (2013.01); *B62K 21/18* (2013.01);
(Continued)

(58) Field of Classification Search
CPC . B62K 5/06; B62K 5/027; B62K 5/05; B62K 21/18; B62K 25/04;
(Continued)

(56) References Cited

U.S. PATENT DOCUMENTS 3,521,904 A 7/1970 Sheffer
3,698,502 A 10/1972 Patin
(Continued)

FOREIGN PATENT DOCUMENTS

CN 103249578 A 8/2013
DE 29902656 U1 2/2000
(Continued)

OTHER PUBLICATIONS

MatWeb Material Property Data: Aluminum, Al, [retrieved on May 4, 2009], Retrieved from the Internet: <URL: http://www.matweb.com/search/DataSheet.aspx?MatGUID=0cd1edf33ac145ee93a0aa6fc666c0e0 (Year: 2009).*
(Continued)

*Primary Examiner* — Drew J Brown
(74) *Attorney, Agent, or Firm* — BCF LLP

(57) ABSTRACT

A vehicle includes a frame including a lower frame portion made from a first material and an upper frame portion made from a second material different from the first material, a center of gravity of the upper frame portion being above a center of gravity of the lower frame portion, at least one front suspension system connected to the lower frame portion, at least one front ground engaging member connected to the front suspension systems, at least one rear suspension (Continued)

system connected to the lower frame portion, at least one rear ground engaging member operatively connected to the rear suspension system, a power pack connected to and supported by the lower frame portion, a seat connected to and supported by at least one of the upper frame portion and the lower frame portion, and at least one body panel connected to and supported by the upper frame portion.

22 Claims, 19 Drawing Sheets

(51) Int. Cl.
  *B62K 5/05* (2013.01)
  *B62K 21/18* (2006.01)
  *B62K 25/04* (2006.01)
  *B62M 7/02* (2006.01)
  *B62M 15/00* (2006.01)
  *B62K 5/00* (2013.01)

(52) U.S. Cl.
  CPC ............... *B62K 25/04* (2013.01); *B62M 7/02* (2013.01); *B62M 15/00* (2013.01); *B62K 2005/001* (2013.01)

(58) Field of Classification Search
  CPC .. B62K 2005/001; B62K 19/10; B62K 11/04; B62K 19/24; B62K 19/16; B62K 5/08; B62M 7/02; B62M 15/00; B62J 25/00
  See application file for complete search history.

(56) References Cited

U.S. PATENT DOCUMENTS

| | | | |
|---|---|---|---|
| 4,623,167 A | 11/1986 | Matsubayashi et al. | |
| 4,735,275 A | 4/1988 | Tsukahara et al. | |
| 4,770,262 A | 9/1988 | Yasunaga et al. | |
| 4,787,470 A | 11/1988 | Badsey | |
| 4,924,961 A | 5/1990 | Bernardi | |
| 5,174,627 A | 12/1992 | Cleereman et al. | |
| 5,480,001 A | 1/1996 | Hara | |
| 5,836,412 A | 11/1998 | Lyles et al. | |
| 5,845,728 A | 12/1998 | Itoh et al. | |
| 5,845,918 A | 12/1998 | Grinde et al. | |
| 5,975,624 A | 11/1999 | Rasidescu et al. | |
| 6,142,498 A | 11/2000 | Smith | |
| 6,170,841 B1 | 1/2001 | Mizuta | |
| 6,264,241 B1 | 7/2001 | Tadanori | |
| 6,305,700 B1 | 10/2001 | Bruehl | |
| 6,572,129 B1 | 6/2003 | Bean | |
| 6,799,781 B2 | 10/2004 | Rasidescu et al. | |
| 6,948,581 B2 | 9/2005 | Fecteau et al. | |
| 7,021,664 B2 | 4/2006 | Mercier et al. | |
| 7,237,637 B2 | 7/2007 | Fecteau et al. | |
| 7,416,046 B2 | 8/2008 | Aube et al. | |
| 7,464,781 B2 | 12/2008 | Guay et al. | |
| 7,543,672 B2 | 6/2009 | Codere et al. | |
| 7,568,541 B2 | 8/2009 | Pfeil et al. | |
| 7,571,787 B2 | 8/2009 | Saiki | |
| 7,588,110 B2 | 9/2009 | Martino | |
| 7,610,979 B1 | 11/2009 | Dykowski et al. | |
| 7,665,742 B2 | 2/2010 | Haerr et al. | |
| 7,770,683 B2 | 8/2010 | Keogh et al. | |
| 7,806,215 B2 | 10/2010 | Codere et al. | |
| 7,845,452 B2 | 12/2010 | Bennett et al. | |
| 7,926,607 B2 | 4/2011 | Seiter | |
| 7,997,372 B2 | 8/2011 | Maltais | |
| 8,006,798 B2 | 8/2011 | Portelance | |
| 8,007,005 B2* | 8/2011 | Yamashita | B62K 5/01 280/785 |
| 8,074,759 B2 | 12/2011 | Rasidescu et al. | |
| 8,086,382 B2 | 12/2011 | Dagenais et al. | |
| 8,260,535 B2 | 9/2012 | Dagenais | |
| 8,393,306 B2 | 3/2013 | Schiffer et al. | |
| 8,413,758 B2* | 4/2013 | Shiina | B62K 5/01 180/311 |
| 8,438,942 B2 | 5/2013 | Wilflinger et al. | |
| 8,544,587 B2 | 10/2013 | Holroyd et al. | |
| 8,577,588 B2 | 11/2013 | Dagenais | |
| 8,655,565 B2 | 2/2014 | Dagenais et al. | |
| 8,695,746 B2 | 4/2014 | Holroyd et al. | |
| 9,004,214 B2 | 4/2015 | Holroyd et al. | |
| 9,020,744 B2 | 4/2015 | Dagenais | |
| 9,043,111 B2 | 5/2015 | Dagenais et al. | |
| 9,260,160 B1 | 2/2016 | Yasuda et al. | |
| 10,843,758 B2* | 11/2020 | Hebert | B62K 25/005 |
| 2002/0117843 A1 | 8/2002 | Rasidescu et al. | |
| 2003/0111283 A1 | 6/2003 | Takeo et al. | |
| 2003/0221890 A1 | 12/2003 | Fecteau et al. | |
| 2004/0035623 A1* | 2/2004 | Fecteau | B62K 5/05 180/210 |
| 2004/0035626 A1 | 2/2004 | Girouard et al. | |
| 2004/0050605 A1 | 3/2004 | Fecteau et al. | |
| 2004/0231908 A1 | 11/2004 | Michisaka et al. | |
| 2005/0092538 A1 | 5/2005 | Baldwin et al. | |
| 2005/0126842 A1 | 6/2005 | Rasidescu et al. | |
| 2006/0006623 A1 | 1/2006 | Leclair | |
| 2006/0180383 A1 | 8/2006 | Bataille et al. | |
| 2006/0254842 A1 | 11/2006 | Dagenais et al. | |
| 2007/0045020 A1 | 3/2007 | Martino | |
| 2007/0193812 A1 | 8/2007 | Adachi et al. | |
| 2007/0251745 A1 | 11/2007 | Codere et al. | |
| 2007/0256882 A1 | 11/2007 | Bedard et al. | |
| 2008/0257298 A1 | 10/2008 | Inui et al. | |
| 2009/0007878 A1 | 1/2009 | Korenjak et al. | |
| 2009/0152940 A1 | 6/2009 | Mercier et al. | |
| 2009/0218153 A1 | 9/2009 | Codere et al. | |
| 2009/0224497 A1 | 9/2009 | Seiter | |
| 2009/0272593 A1* | 11/2009 | Myers | B62K 11/04 180/219 |
| 2009/0321169 A1 | 12/2009 | Bedard et al. | |
| 2010/0059979 A1 | 3/2010 | Soda et al. | |
| 2010/0263956 A1 | 10/2010 | Bedard et al. | |
| 2011/0168473 A1 | 7/2011 | Bedard et al. | |
| 2012/0024612 A1 | 2/2012 | Ballard | |
| 2013/0186701 A1 | 7/2013 | Bedard et al. | |
| 2013/0341113 A1 | 12/2013 | Mullin | |
| 2014/0131131 A1 | 5/2014 | Marois et al. | |
| 2015/0061275 A1 | 3/2015 | Deckard et al. | |
| 2015/0122567 A1 | 5/2015 | Marois et al. | |
| 2015/0175209 A1 | 6/2015 | Holroyd et al. | |
| 2015/0274213 A1 | 10/2015 | Rudwal et al. | |
| 2019/0016177 A1 | 1/2019 | Mercier et al. | |
| 2019/0023123 A1 | 1/2019 | Laberge et al. | |
| 2019/0039668 A1 | 2/2019 | Laberge et al. | |

FOREIGN PATENT DOCUMENTS

| | | |
|---|---|---|
| EP | 0826584 A2 | 4/1998 |
| EP | 0826584 B1 | 4/2003 |
| EP | 1903257 A2 | 3/2008 |
| EP | 2348201 A1 | 7/2011 |
| GB | 145951 A | 7/1920 |
| GB | 2512435 A | 10/2014 |
| JP | S60157921 A | 8/1985 |
| JP | S63223330 A | 9/1988 |
| JP | H0265934 A | 3/1990 |
| WO | 03070548 A1 | 8/2003 |
| WO | 2015036983 A2 | 3/2015 |
| WO | 2015036984 A1 | 3/2015 |
| WO | 2015036985 A1 | 3/2015 |
| WO | 2015079425 A1 | 6/2015 |
| WO | 2015079426 A1 | 6/2015 |

OTHER PUBLICATIONS

Linul et al. "Mechanical Characterization of Rigid PUR Foams Used for Wind Turbine Blades Construction", World Academic Publishing, Dec. 20, 2013, pp. 171-193.
Davis, "Aluminum and Aluminum Alloys", 2001, ASM International, pp. 351-416.

(56) References Cited

OTHER PUBLICATIONS

MatWeb Material Property Data: Aluminum, Al, [retrieved on May 4, 2009]. Retrieved from the Internet: <URL:http://www.matweb.com/search/DataSheet.aspx?MatGUID=0cd1edf33ac145ee93a0aa6fc666c0e0&ckck=1.
MatWeb Material Property Data: Steels, General Properties, [retrieved on Nov. 14, 2007]. Retrieved from the Internet: <URL: http://www.http://www.matweb.com/search/DataSheet.aspx?MatGUID=10e1c14130cd4ed6ae64b85723be53af.
International Search Report of PCT/IB2018/53211; dated Sep. 14, 2018; Shane Thomas.
International Search Report of PCT/US2006/016352; dated Jan. 31, 2007; Feber, Laurent.
Reinmech Sales Brochure Located, May 25, 2000.
Suzuki LT-F160 Parts Catalog, Figure 24 (E-2) Frame, May 1997.
International Search Report of PCT/IB2017/050492; dated May 19, 2017; Lee W. Young.
Supplementary European Search Report of Corresponding EP Application No. 17743829.8; The Hague; dated Aug. 7, 2019; Mark Phil Simens.
English Abstract of JPS63223330; Retrieved on Nov. 15, 2019 from www.worldwide.espacenet.com.
English Abstract of JPS60157921; Retrieved on Nov. 15, 2019 from www.worldwide.espacenet.com.
English Abstract of JPH0265934; Retrieved on Nov. 15, 2019 from www.worldwide.espacenet.com.
Supplementary European Search Report of 17743830.6; The Hague; dated Aug. 27, 2019; Booij, Nico.
International Search Report of PCT/IB2017/050494; dated Jun. 7, 2017; Shane Thomas.
Search Report issued by the Chinese Patent Office in connection with the corresponding application No. 201780014515.9, dated Nov. 22, 2019; Guo Zhipeng. X.
English Abstract of CN103249578A; Retrieved on Feb. 13, 2020 from www.worldwide.espacenet.com.
English translation of DE29902656U1; Retrieved on Feb. 13, 2020 from www.worldwide.espacenet.com.

* cited by examiner

VEHICLE WITH UPPER AND LOWER FRAME PORTIONS

CROSS-REFERENCE

The present application claims priority to U.S. Provisional Patent Application No. 62/505,167, entitled "Vehicle with Upper and Lower Frame Portions", filed on May 12, 2017, the entirety of which is incorporated herein by reference.

FIELD OF TECHNOLOGY

The present technology relates vehicles having an upper frame portion and a lower frame portion made from different materials.

BACKGROUND

Three-wheeled straddle-seat vehicles have been developed for road use with a desire to combine the riding qualities experienced in four wheeled automobiles and two wheeled motorcycles.

For example, automobiles are inherently more stable than motorcycles due to the presence of four wheels, but motorcycles have greater maneuverability due to the smaller size and weight of motorcycles. Motorcycles are also considered by some to provide a better driving performance when compared to automobiles. Three-wheeled straddle-seat vehicles are more stable than motorcycles while providing a similar driving experience. Three-wheeled straddle-seat vehicles are therefore quite popular for touring and sport purposes.

For even greater stability in three-wheeled straddle-seat vehicles, it is desirable for the center of gravity to be as low as possible. One limiting factor in lowering the center of gravity in these vehicles is the frame, which is generally formed from a strong, but heavy, material. Frames, such as that described in U.S. Pat. No. 7,543,672, often include portions extending up over the engine to support the steering column and another portion extending upward in front of the engine to support the front suspension assemblies.

One solution known in the art is to replace some frame members with frame members made of a lighter, but still sufficiently strong material. One known disadvantage to this approach is that generally lighter material with sufficient strength to support the loads necessary can be much more costly then typical frame material, such as steel.

There is therefore a desire for a vehicle with a low center of gravity, while still having a good cost to strength ratio.

SUMMARY

It is an object of the present technology to ameliorate at least some of the inconveniences present in the prior art.

According to one aspect of the present technology, there is provided a vehicle having an upper frame portion and a lower frame portion made from a material different than the upper frame portion. The lower frame portion is made from a denser and stronger material and supports most load-bearing connections on the vehicle, including the engine, transmission, and suspension. The upper frame portion can then be made of a lighter and less costly material. This further allows the vehicle to have a lower center of gravity compared to a same frame made entirely of one material, while still providing the required overall strength and structure. Additionally, the overall frame will generally require less material expense due to the substitution of some of the more costly material with less costly material.

According to one aspect of the present technology, there is provided a vehicle including a frame including a lower frame portion made from a first material, and an upper frame portion connected to the lower frame portion, the upper frame portion being made from a second material different from the first material, a center of gravity of the upper frame portion being above a center of gravity of the lower frame portion; at least one front suspension system connected to the lower frame portion; at least one front ground engaging member, the at least one ground engaging member being operatively connected to the at least one front suspension system; at least one rear suspension system connected to the lower frame portion; at least one rear ground engaging member operatively connected to the at least one rear suspension system; a power pack for providing power to at least one of the at least one front ground engaging member, and the at least one rear ground engaging member, the power pack being connected to and supported by the lower frame portion; at least one seat connected to and supported by at least one of the upper frame portion and the lower frame portion; and a steering system operatively connected to the at least one front ground engaging member for steering the vehicle, the steering system including a steering column rotatably supported by the upper frame portion.

According to another aspect of the present technology, there is provided a vehicle including a frame including a lower frame portion made from a first material, and an upper frame portion connected to the lower frame portion, the upper frame portion being made from a second material different from the first material, a center of gravity of the upper frame portion being above a center of gravity of the lower frame portion; at least one front suspension system connected to the lower frame portion; at least one front ground engaging member, the at least one ground engaging member being operatively connected to the at least one front suspension system; at least one rear suspension system connected to the lower frame portion; at least one rear ground engaging member operatively connected to the at least one rear suspension system; a power pack for providing power to at least one of the at least one front ground engaging member, and the at least one rear ground engaging member, the power pack being connected to and supported by the lower frame portion; at least one seat connected to and supported by at least one of the upper frame portion and the lower frame portion; and at least one body panel connected to and supported by the upper frame portion.

In some implementations of the present technology, the first material has a higher density then the second material.

In some implementations of the present technology, a center of gravity of the power pack is above the center of gravity of the lower frame portion.

In some implementations of the present technology, the vehicle further includes a steering system operatively connected to the at least one ground engaging member for steering the vehicle, the steering system including a steering column rotatably supported by the upper frame portion.

In some implementations of the present technology, the vehicle further includes at least one body panel connected to and supported by the upper frame portion.

In some implementations of the present technology, the steering column is rotatably connected to the upper frame portion at an upper portion of the steering column; a bottom portion of the steering column is pivotably connected to the lower frame portion; and the steering column extends upward and rearward from the bottom end of the steering column to the upper portion of the steering column.

In some implementations of the present technology, the pack power includes an internal combustion engine, and a transmission system; and the internal combustion engine and the transmission system are rigidly connected to each other.

In some implementations of the present technology, the upper frame portion includes a left upper frame member, and a right upper frame member; the left upper frame portion and the right upper frame portion are fastened together along a longitudinal centerline of the vehicle.

In some implementations of the present technology, the at least one front suspension system is two front suspension systems; the at least one front ground engaging member is two front ground engaging members; and a front portion of the lower frame portion includes a plurality of suspension mounts for connecting the two front suspension systems thereto, the plurality of suspension mounts including at least two mounts for connecting two pivoting arms of the two front suspension systems, and at least two mounts for connecting two shock absorbers of the two front suspension systems.

In some implementations of the present technology, the upper frame portion extends over a top of the power pack; and the upper frame portion is connected to the lower frame portion near a front of the power pack and behind the power pack.

In some implementations of the present technology, the upper frame portion is selectively fastened to the lower frame portion by a plurality of fasteners; upon removal of at least some of the plurality of fasteners, the upper frame portion is upwardly pivotable with respect to the lower frame portion; and when the upper frame portion has been pivoted upward with respect to the lower frame portion, a rear side of the power pack is accessible.

In some implementations of the present technology, the upper frame portion includes a seat portion; the at least one seat is connected to the seat portion of the upper frame portion; and the lower frame portion extends rearward below seat portion for supporting the at least one seat and the seat portion of the upper frame portion.

In some implementations of the present technology, the vehicle further includes at least one headlight connected to the upper frame portion; and wherein the upper frame portion defines at least one recess for receiving the at least one headlight.

In some implementations of the present technology, the vehicle further includes a storage bin supported by the upper frame portion.

In some implementations of the present technology, the vehicle further includes a gas tank connected to and supported by the upper frame portion.

In some implementations of the present technology, the vehicle further includes a muffler connected to and supported by the lower frame portion.

In some implementations of the present technology, the vehicle further includes at least one foot rest connected to the lower frame portion.

In some implementations of the present technology, the vehicle further includes a radiator connected to and supported by a forward portion of the lower frame portion.

In some implementations of the present technology, the power pack is connected to the lower frame portion by a plurality of vibration absorbing mounts.

In some implementations of the present technology, the vehicle further includes a plurality of body panels connected to the upper frame portion.

In some implementations of the present technology, the first material is a metal and the lower frame portion comprises a plurality of lower frame members welded together.

In some implementations of the present technology, the upper frame portion comprises a plurality of molded upper frame members fastened together.

In some implementations of the present technology, the second material is at least in part a thermoplastic.

In some implementations of the present technology, a yield strength of the first material is at least ten times a yield strength of the second material.

In some implementations of the present technology, a Young's modulus of the first material is at least twenty times a Young's modulus of the second material.

In some implementations of the present technology, the Young's modulus of the first material is at least fifty times the Young's modulus of the second material.

In some implementations of the present technology, a Poisson's ratio of the second material is at least 1.3 times a Poisson's ratio of the first material.

In some implementations of the present technology, a density of the first material is at least 2.5 times a density of the second material.

In some implementations of the present technology, the density of the first material is at least 7.5 times the density of the second material.

In some implementations of the present technology, the at least one front suspension system and the at least one rear suspension system are connected to the lower frame portion via load bearing mounts.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
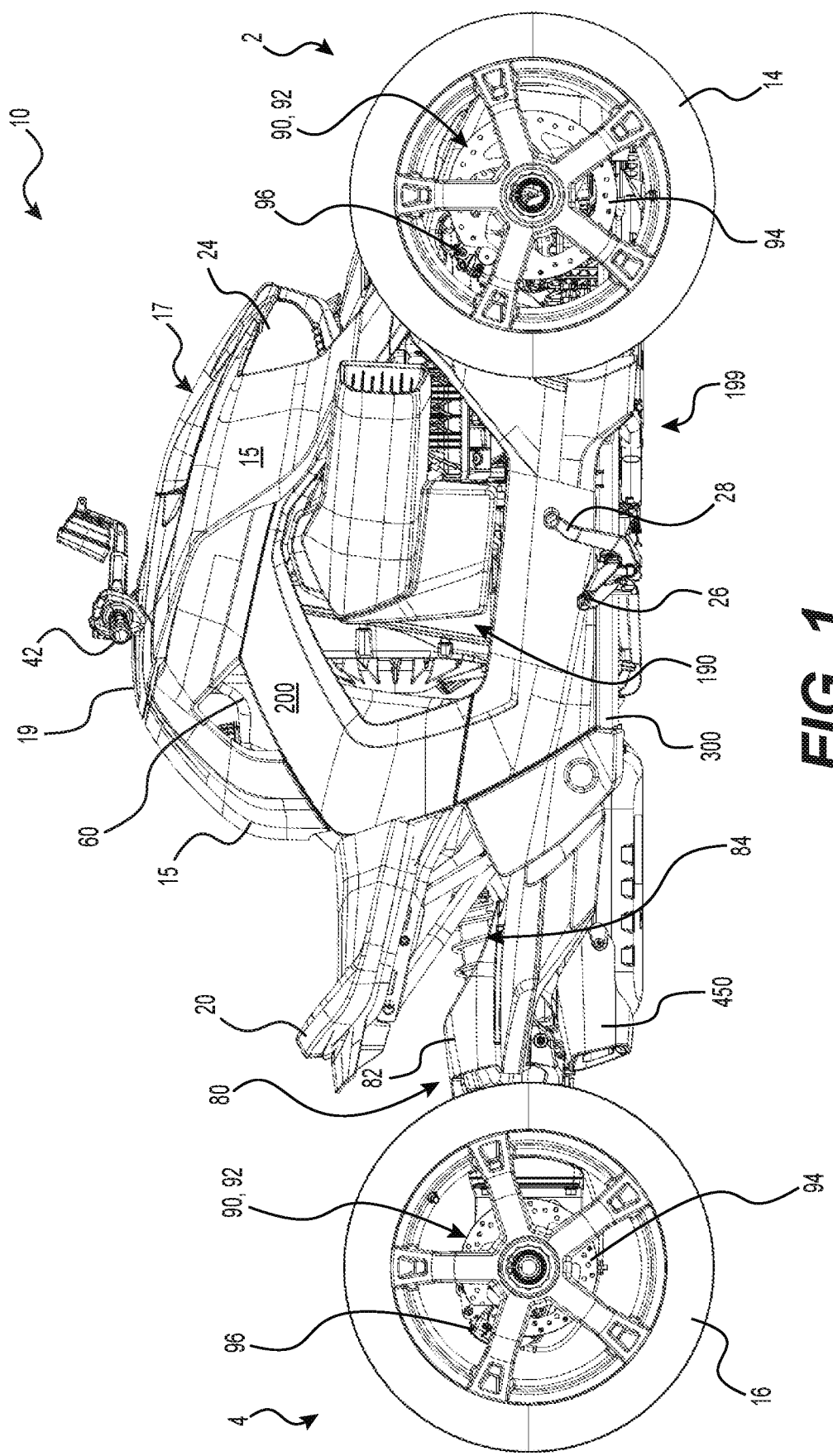
FIG. 1 is a right side elevation view of a vehicle according to the present technology.

It should also be noted that, unless otherwise explicitly specified herein, the drawings are not necessarily to scale.

DETAILED DESCRIPTION

The present technology will be described herein with respect to a three-wheeled straddle-type vehicle 10. It is contemplated that at least some aspects of the present technology could also be implemented with vehicles have two, four, or more wheels.

With reference to FIGS. 1 to 4, a vehicle 10 has a front end 2, a rear end 4, and a longitudinal centerplane 3 defined consistently with the forward travel direction of the vehicle 10. The vehicle 10 has a frame 199. The frame 199 includes an upper frame portion 200 and a lower frame portion 300, each of which will be described in more detail below.

The vehicle 10 is a three-wheeled vehicle 10 including a left front wheel 14 mounted to the lower frame portion 300 by a left front suspension assembly 70 and a right front wheel 14 mounted to the lower frame portion 300 by a right front suspension assembly 70. A single rear wheel 16 mounted to the lower frame portion 300 by a rear suspension assembly 80. The left and right front wheels 14 and the rear wheel 16 each have a tire secured thereto. The front wheels 14 are disposed equidistant from the longitudinal centerplane 3, and the rear wheel 16 is centered with respect to the longitudinal centerplane 3. It is contemplated that the present technology could also be implemented on a vehicle with two rear wheels 16 and a single, centered front wheel 14.

Figure 4:
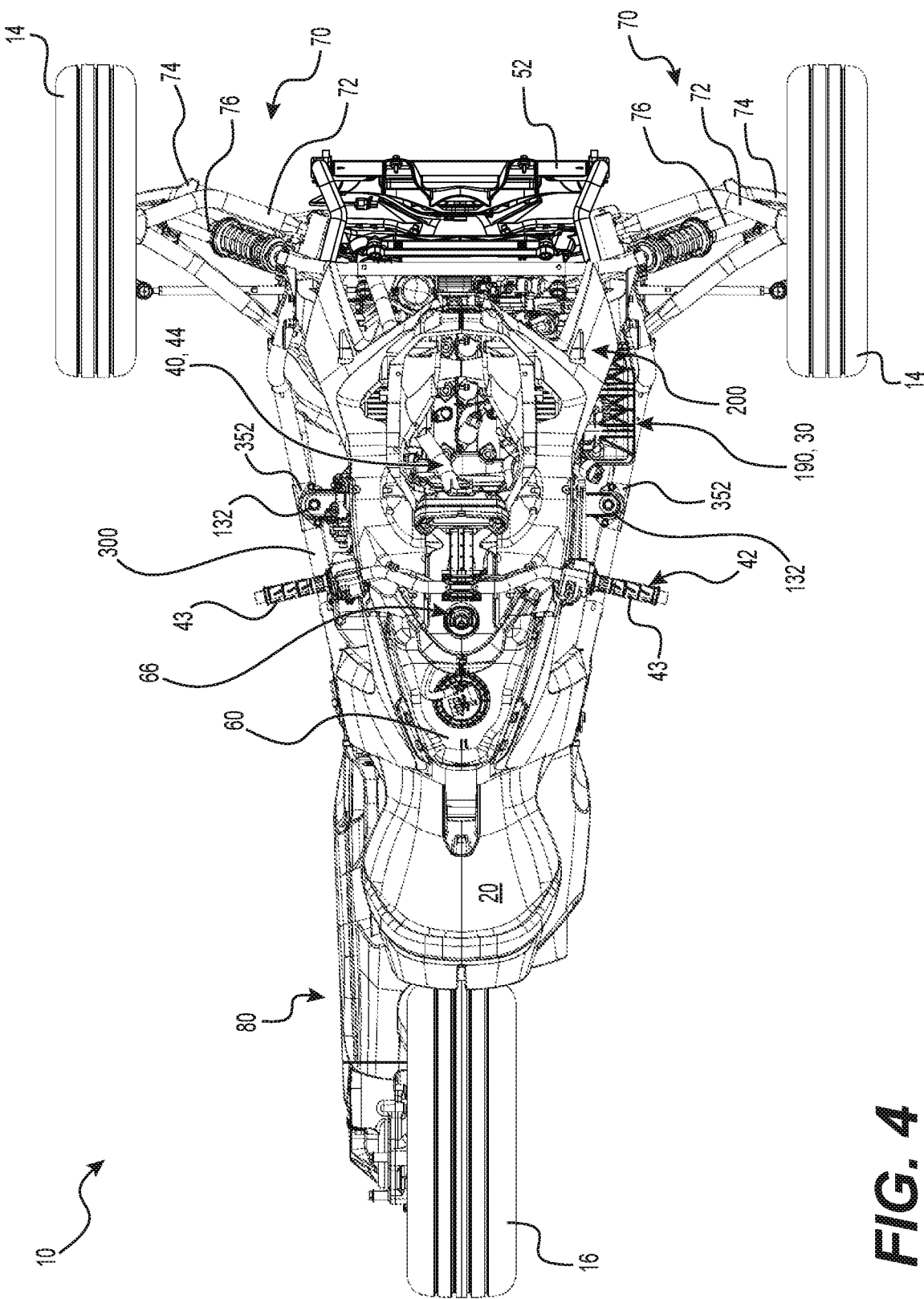
FIG. 4 is a top plan elevation view of the vehicle of FIG. 3.
Figure 6:
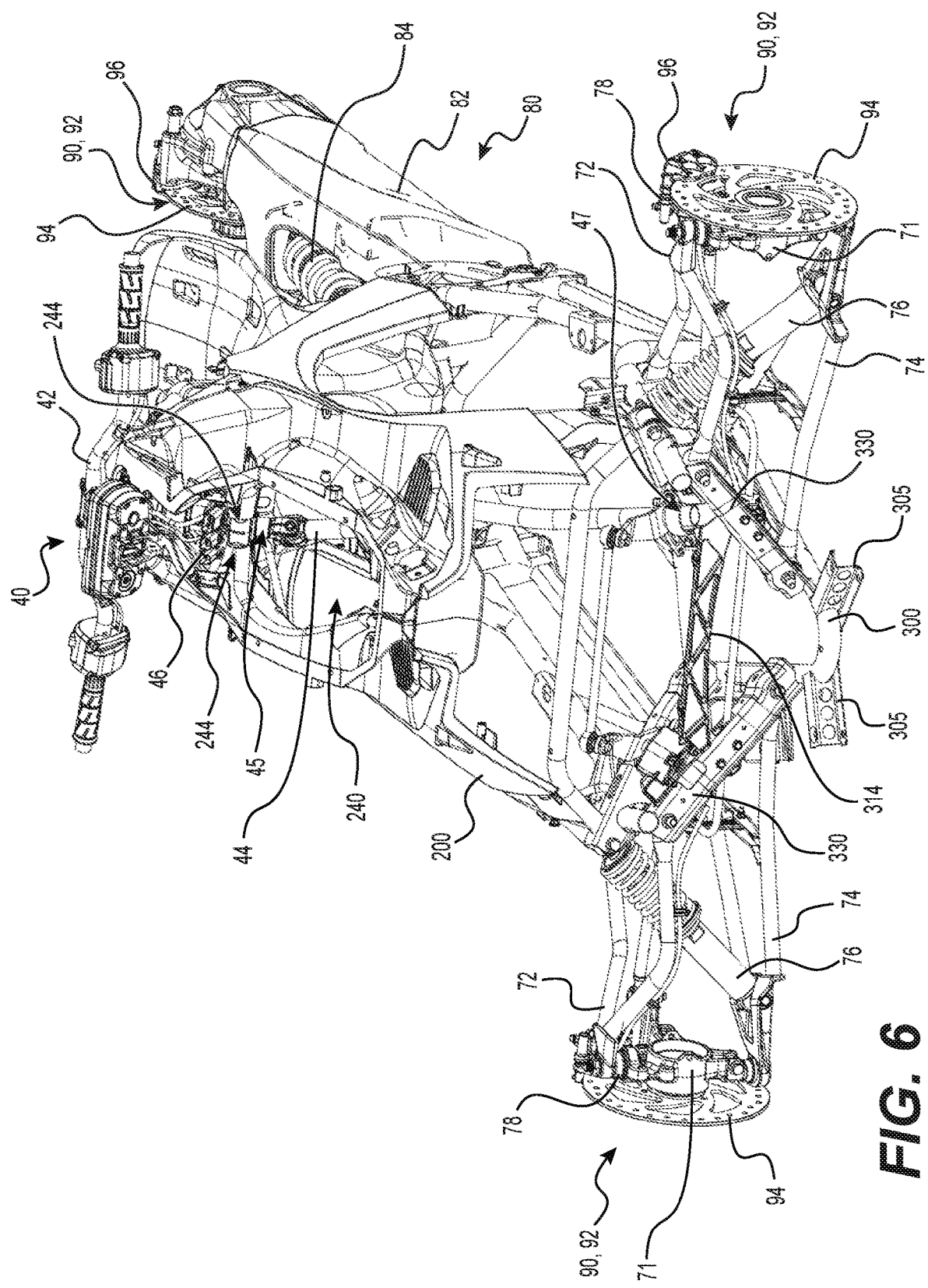
FIG. 6 is a front, left side perspective view of a frame, steering system, and suspensions systems of the vehicle of FIG. 1.

In the illustrated implementation and as can be seen in FIGS. 4 and 6, each front suspension assembly 70 is a double A-arm type suspension, also known as a double wishbone suspension. It is contemplated that other types of suspensions, such as a McPherson strut suspension, or swing arm could be used. Each front suspension assembly 70 includes an upper A-arm 72, a lower A-arm 74 and a shock absorber 76. The right front suspension assembly 70 is a mirror image of the left front suspension assembly 70, and as such only the left front suspension assembly 70 will be described herein. Each A-arm 72, 74 has a front member and a rear member. The laterally outer ends of the front and rear members are connected to each other while the laterally inner ends of the front and rear members of each A-arm 72, 74 are spaced apart from each other.

The lower end of the shock absorber 76 is connected to the front and rear members of the lower A-arm 74 slightly laterally inward of the laterally outer ends. The laterally inner ends of the upper and lower A-arms 72, 74 are pivotally connected to the lower frame portion 300 as will be described below. As can be seen in FIG. 6, the laterally outer ends of the upper and lower A-arms 72, 74 are pivotally connected to the top and bottom respectively of a knuckle 78. The front wheel 14 is connected to a spindle 71 that is connected to the knuckle 78.

The rear suspension assembly 80 includes a swing arm 82 and a shock absorber 84. The swing arm 82 is pivotally mounted at a front thereof to the lower frame portion 300, as will be described in more detail below. The rear wheel 16 is rotatably mounted to the rear end of the swing arm 82 which extends on a left side of the rear wheel 16. The shock absorber 84 is connected between the swing arm 82 and the lower frame portion 300.

The vehicle 10 has a straddle seat 20 mounted to the upper frame portion 200 and disposed along the longitudinal centerplane 3. In some other implementations, the straddle seat 20 is connected to the lower frame portion 300 instead of the upper frame portion 200, as will be described in more detail below. In the illustrated implementation, the straddle seat 20 is intended to accommodate a single adult-sized rider, i.e. the driver. It is however contemplated that a passenger seat portion could be connected to the lower frame portion 300, as will be described below, in order to accommodate a passenger behind the driver.

Figure 2:
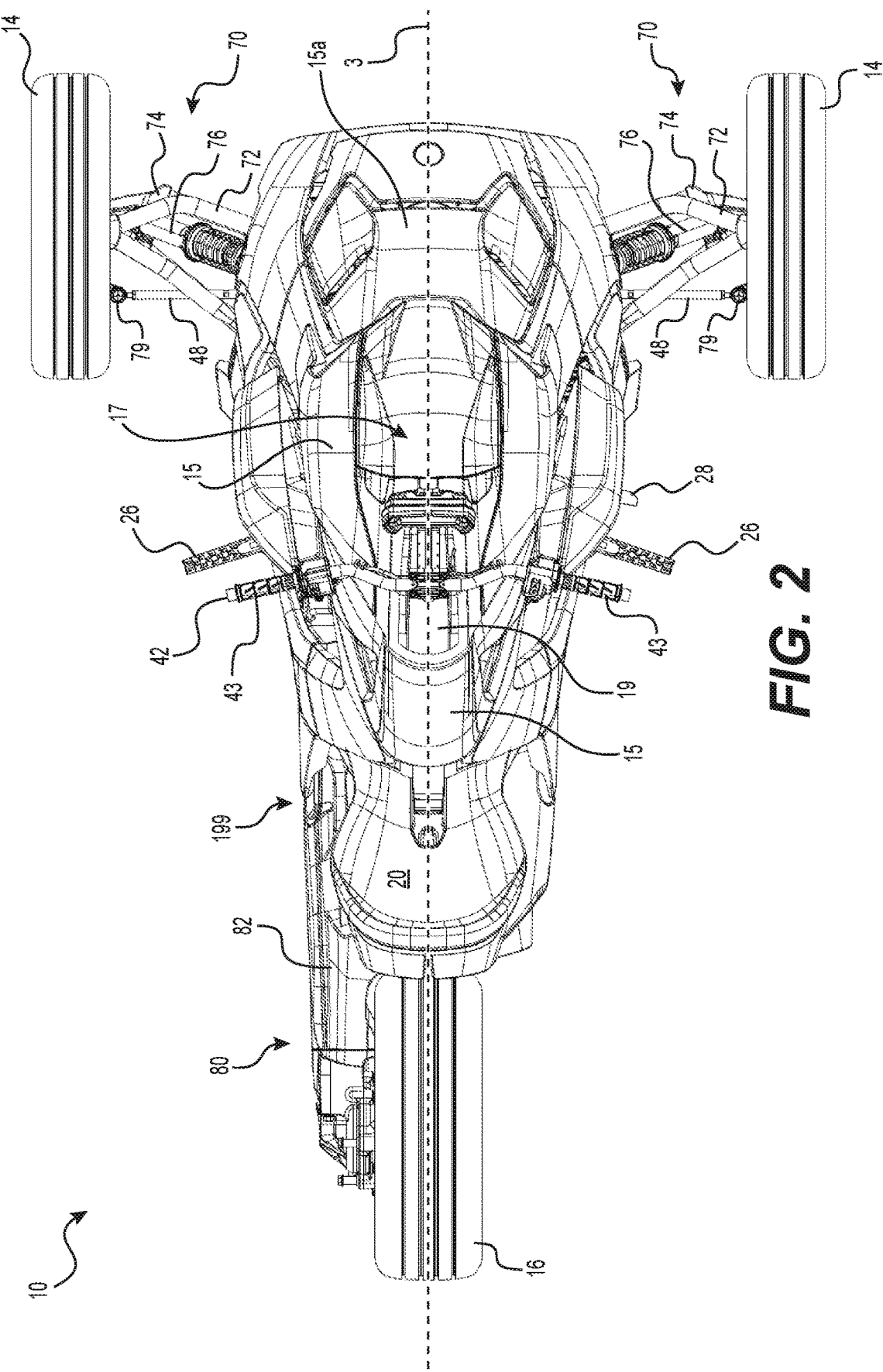
FIG. 2 is a top plan view of the vehicle of FIG. 1.

A driver footrest 26 is disposed on either side of the vehicle 10 and vertically lower than the straddle seat 20 to support the driver's feet (see FIGS. 1 and 2). The driver footrests 26 are connected to the lower frame portion 300. In the implementation of the vehicle 10 illustrated herein, the driver footrests 26 are in the form of foot pegs disposed longitudinally forward of the straddle seat 20. It is also contemplated that the footrests 26 could be in the form of footboards. It is contemplated that the vehicle 10 could also be provided with one or more passenger footrests disposed rearward of the driver footrest 26 on each side of the vehicle 10, for supporting a passenger's feet when a passenger seat portion for accommodating a passenger is connected to the vehicle 10. A brake pedal 28 is connected to the right driver footrest 26 for braking the vehicle 10. The brake pedal 28 extends upwardly and forwardly from the right driver footrest 26 such that the driver can actuate the brake pedal 28 with a front portion of the right foot while a rear portion of the right foot remains on the right driver footrest 26.

With reference to FIGS. 4 and 6, the vehicle 10 includes a steering assembly 40. A handlebar 42, which is part of the steering assembly 40, is disposed in front of the seat 20. The handlebar 42 is used by the driver to turn the front wheels 14 to steer the vehicle 10. A left hand grip 43 is placed around the left side of the handlebar 42 near the left end thereof and a right hand grip 43 is placed respectively right sides of the handlebar 42 near the right end to facilitate gripping for turning the handlebar 42 and thereby steering the vehicle 10. The right hand grip 43 provides twist-grip type throttle control. It is contemplated that the brake pedal 28 could be replaced with a brake lever at either the left or right hand grips 43.

A central portion of the handlebar 42 is connected to an upper end of a steering column 44. From the handlebar 42, the steering column 44 extends downwardly and leftwardly. An upper portion 45 of the steering column 44 is rotatably supported by the upper frame portion 200, while a bottom portion 47 of the steering column 44 is pivotably connected to the lower frame portion 300, as will be described in more detail below. The bottom portion 47 of the steering column 44 is operatively connected to the front wheels 14 for steering the vehicle 10. In implementations of a vehicle having a single front wheel, the steering column could be differently implemented, for example in the form of a triple clamp.

Figure 3:
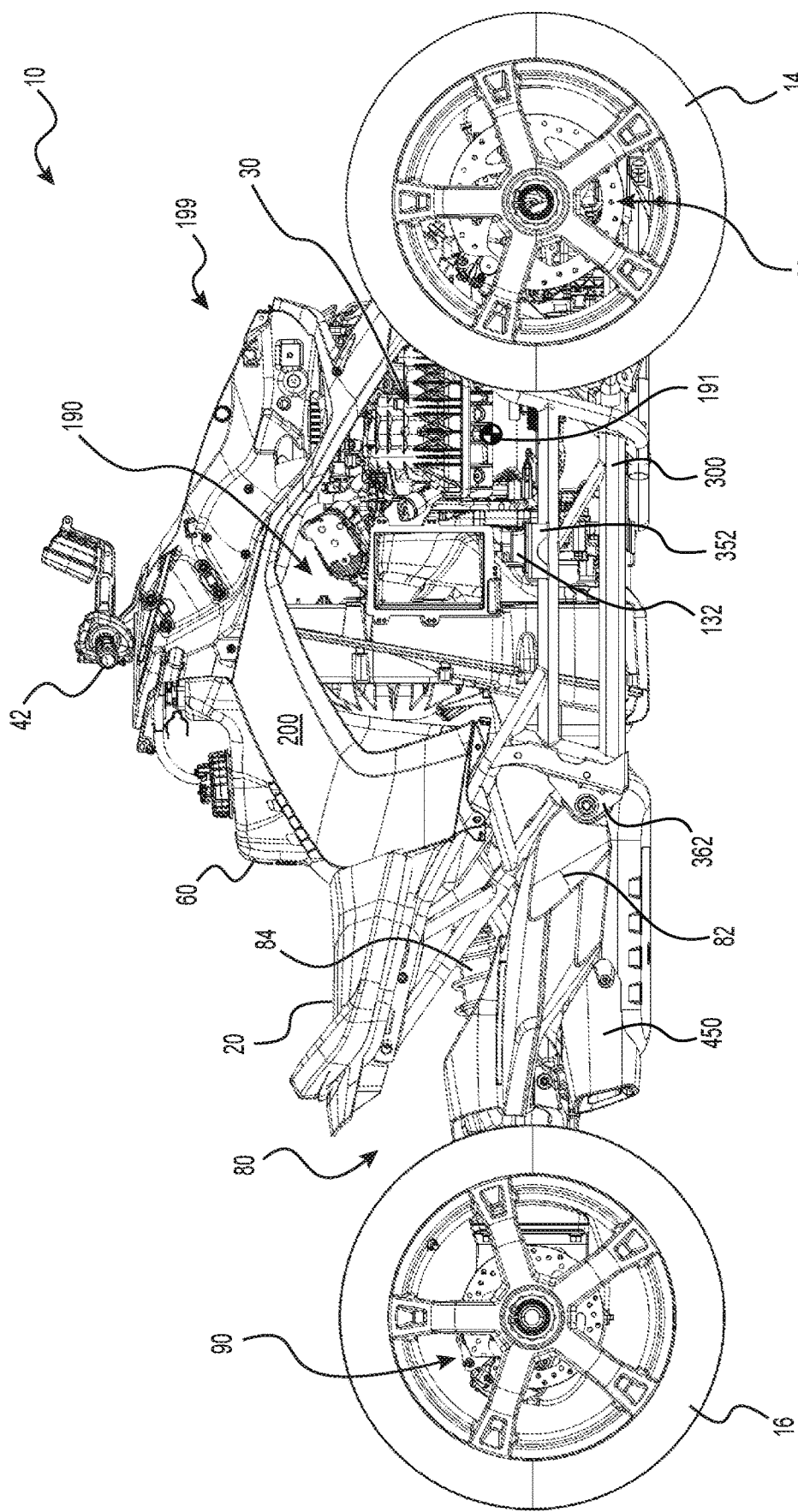
FIG. 3 is a right side elevation view of the vehicle of FIG. 1, with some body panels having been removed to reveal the upper and lower frame portions.
Figure 5:
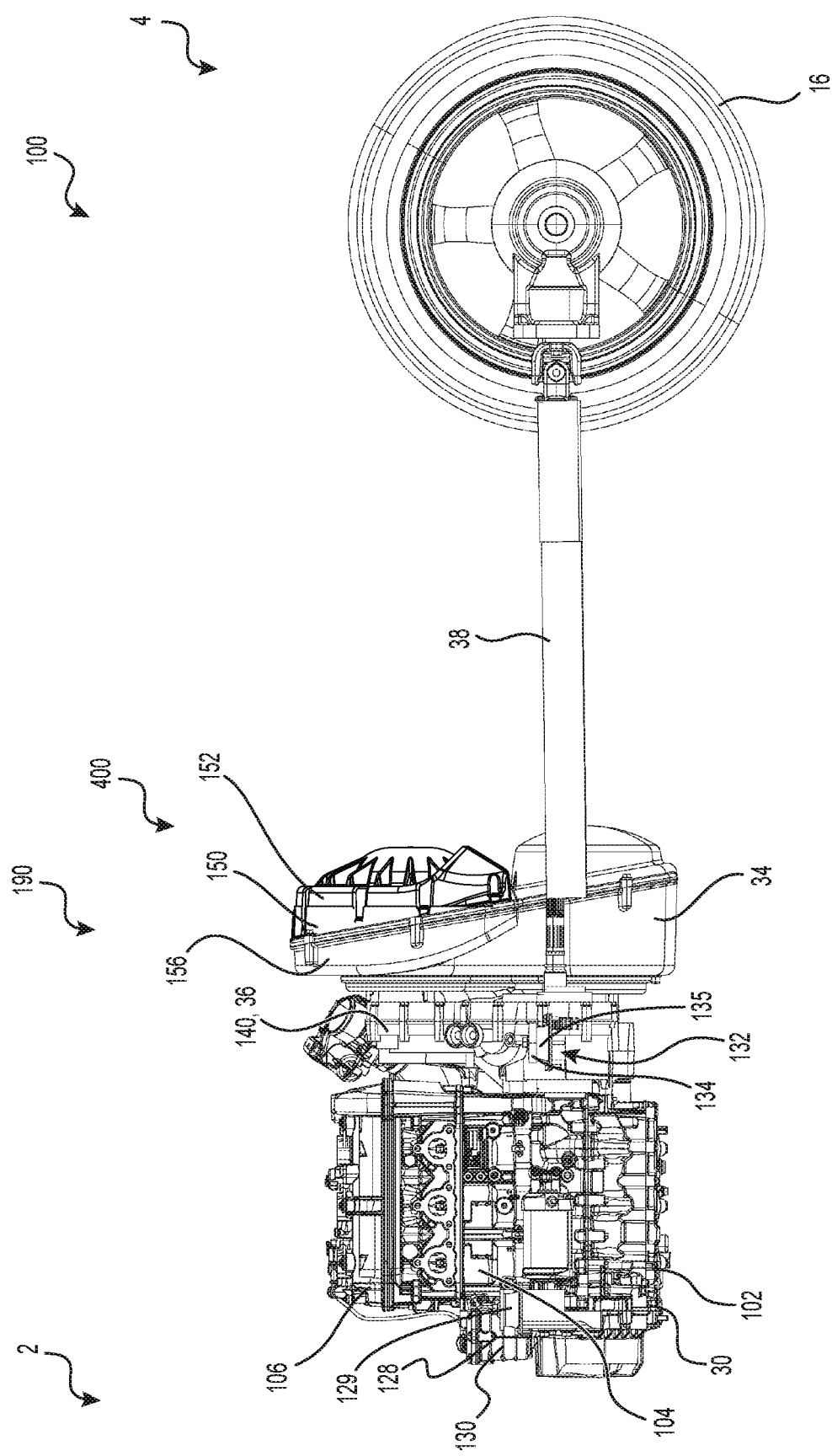
FIG. 5 is a left side elevation view of a powertrain, engine mounting assemblies, and rear wheel of the vehicle of FIG. 1.

As can be seen in FIGS. 3 to 5, the vehicle 10 includes a power pack 190, including a motor 30 and a transmission assembly 400. The transmission assembly 400 includes a continuously variable transmission (CVT) 34 and a transfer case 36 in the present implementation. As will be described below in more detail, the power pack 190 is supported by the lower frame portion 300 and is housed within the frame 199. In the illustrated implementation of the vehicle 10, the motor 30 is in the form of an internal combustion engine. It is however contemplated that the motor 30 could be other than an internal combustion engine, for example an electric motor, a hybrid or the like. The motor 30 will be referred to hereinafter as engine 30 for convenience. The engine 30 is operatively connected to the rear wheel 16 to drive the rear wheel 16.

In the present application, the engine 30 and the transmission system 400 are rigidly connected to each other. As can be seen in FIG. 3, the power pack 190 has a center of gravity 191 located generally above the lower frame portion 300. It is contemplated that in some implementations, the center of gravity 191 could be located vertically higher or lower. It is also contemplated that the power pack 190 could be arranged such that the center of gravity 191 is located generally below the lower frame portion 300.

As can be seen in FIG. 5, the engine 30 has a crankcase 102, a cylinder block 104 disposed on and connected to the crankcase 102, and a cylinder head assembly 106 disposed on and connected to the cylinder block 104. Further detail regarding engines, such as the engine 30, can be found in U.S. Pat. No. 8,393,306 B2, issued on Mar. 12, 2013, the entirety of which is incorporated herein by reference.

The rear wheel 16 is operatively connected to a crankshaft (not shown) of the engine 30 via an engine output shaft (not shown), the CVT 34, the transfer case 36 and a driveshaft 38. It is contemplated that the engine 30 could be connected to the front wheels 14 instead of, or in addition to, the rear wheel 16. The engine 30, the CVT 34, the transfer case 36 and the driveshaft 38 form part of a vehicle powertrain 100. Power produced by the engine 30 is transmitted to the CVT 34, then to the transfer case 36, which in turn drives the driveshaft 38 to turn the rear wheel 16.

As can be seen in FIG. 5, the transfer case 36 is disposed rearward of the engine 30. The transfer case 36 includes a transfer case housing 140 which is mounted to the rear end of the engine 30 via the cylinder block 104 and the crankcase 102. The CVT 34 is disposed rearward of the transfer case 36 and includes a CVT housing 150. The CVT housing 150 includes a front cover 156 and a rear cover 152. The rear cover 152 is removably mounted to the front cover 156. It is contemplated that the vehicle 10 could have a transmission assembly 400 in which the CVT 34 and the transfer case 36 are replaced by a discrete gear transmission or another type of manual, semi-automatic or automatic transmissions.

A front end of the driveshaft 38 is enclosed by the transfer case housing 140. The driveshaft 38 extends longitudinally and rearwardly out of the transfer case housing 140 on a left side of the longitudinal centerplane 3. The rear end of the driveshaft 38 operatively connected to the rear wheel 16 to drive the rear wheel 16 without inhibiting motion of the rear wheel 16 about the rear suspension assembly 80 as the vehicle 10 moves over uneven terrain. It is contemplated that the driveshaft 38 could be omitted and transfer case 36 could be connected to the rear wheel 16 via a chain, belt, or other transmission assembly instead of the driveshaft 38.

Components of the power train 100, the transmission assembly 400, and the power pack 190 are constructed in accordance with similar vehicles and therefore will not be described in more detail here.

The vehicle 10 includes body panels 15 which are connected to and supported by the upper frame portion 200, as will be described in more detail below. The body panels 15 enclose and protect the internal components of the vehicle 10 such as the engine 30. The body panels 15 include a hood 15a disposed at the front of the vehicle 10 between the front wheels 14. Some of the body panels 15 are further connected to cover the lower frame portion 300. The vehicle 10 also includes headlights 24 connected to and supported by the upper frame portion 200, also described in more detail below. The headlights 24 are operatively connected to an electrical harness (not shown) which is supported by both of the upper frame portion 200 and the lower frame portion 300.

As can be seen in FIGS. 1, 3, and 4, a fuel tank 60 disposed behind the CVT 34 supplies fuel to the engine 30. The straddle seat 20 is disposed longitudinally rearward of the fuel tank 60. As will be described in more detail below, the fuel tank 60 is connected to and supported by the upper frame portion 200. The fuel tank 60 includes a fuel filler neck opening 66.

As can be seen in FIGS. 1 and 3, the vehicle 10 also includes an exhaust system fluidly connected to the engine 30, which includes a muffler 450. The engine 30 is fluidly connected to an exhaust manifold and an exhaust conduit (not shown) extending longitudinally and rearwardly from the engine 30. The exhaust conduit fluidly connects to the muffler 450 disposed generally under the seat 20. In the illustrated implementation, the muffler 450 is laterally centered with respect to the longitudinal centerplane 3. The muffler 450 is fastened to a muffler bracket 311 of the lower frame portion 300, as will be described below. It is however contemplated that muffler 450 could not be aligned with the seat 20 in the lateral and/or longitudinal directions. It is contemplated that the muffler 450 could not be laterally centered with respect to the longitudinal centerplane 3.

A radiator 52 (FIG. 4) is mounted to the lower frame portion 300 by brackets 305 (FIG. 6) of the lower frame portion 300. The radiator 52 is disposed longitudinally forward and laterally between the front suspension assemblies 70, 80. The radiator 52 is disposed longitudinally forward of the engine 30 and is fluidly connected to the engine 30 for cooling the engine 30.

With reference to FIGS. 1 and 6, each of the two front wheels 14 and the rear wheel 16 is provided with a brake assembly 90. The brake assemblies 90 of the three wheels 14, 16 form a brake system 92. Each brake assembly 90 is a disc-type brake mounted onto the spindle 71 of the respective wheel 14 or 16. Other types of brakes are contemplated. Each brake assembly 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 94. The brake pedal 28 is operatively connected to the brake assemblies 90 provided on each of the two front wheels 14 and the rear wheel 16.

Figure 7:
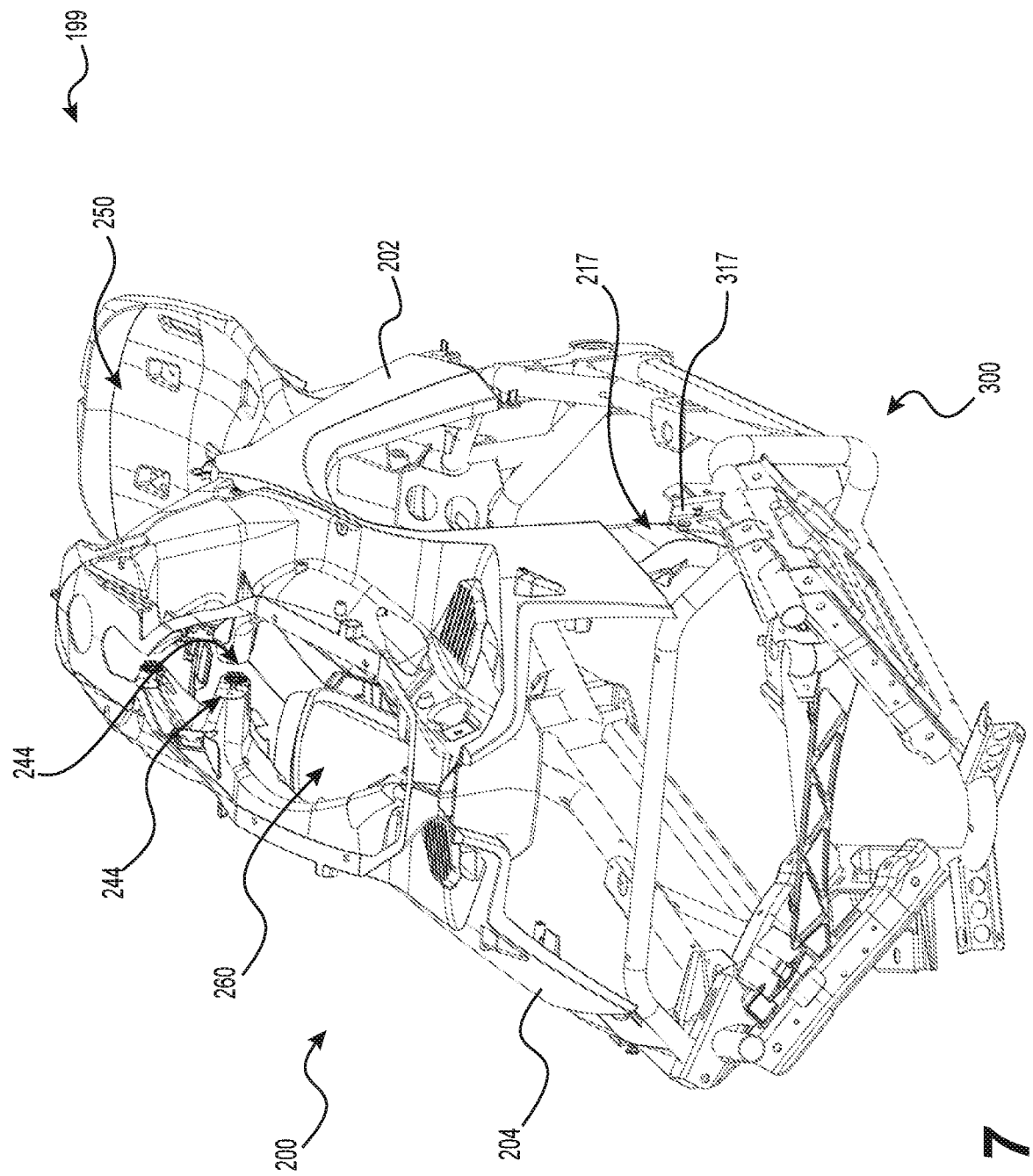
FIG. 7 is a top, front, left side perspective view of the frame of the vehicle of FIG. 1.
Figure 8:
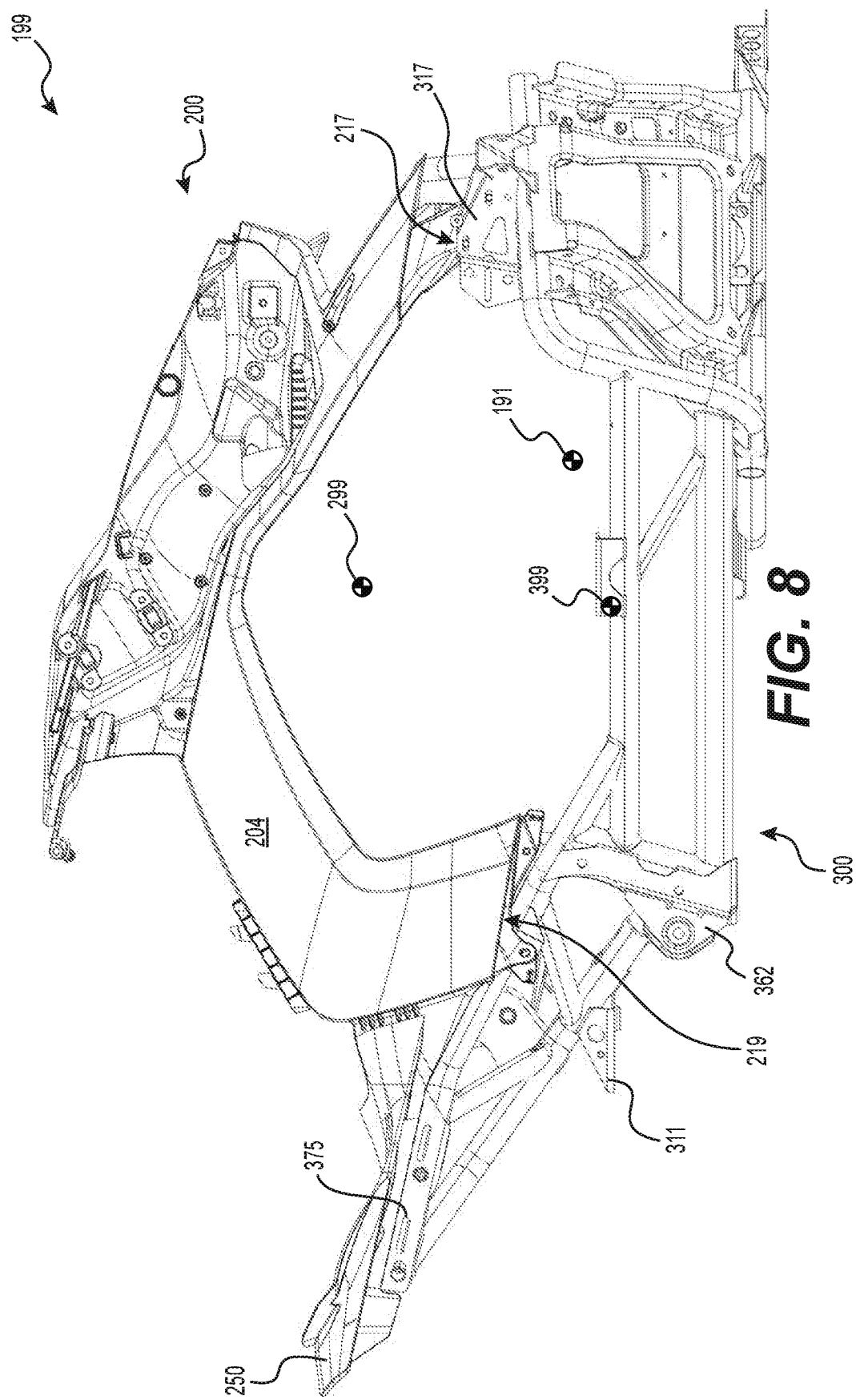
FIG. 8 is a right side elevation view of the frame of FIG. 7.
Figure 9:
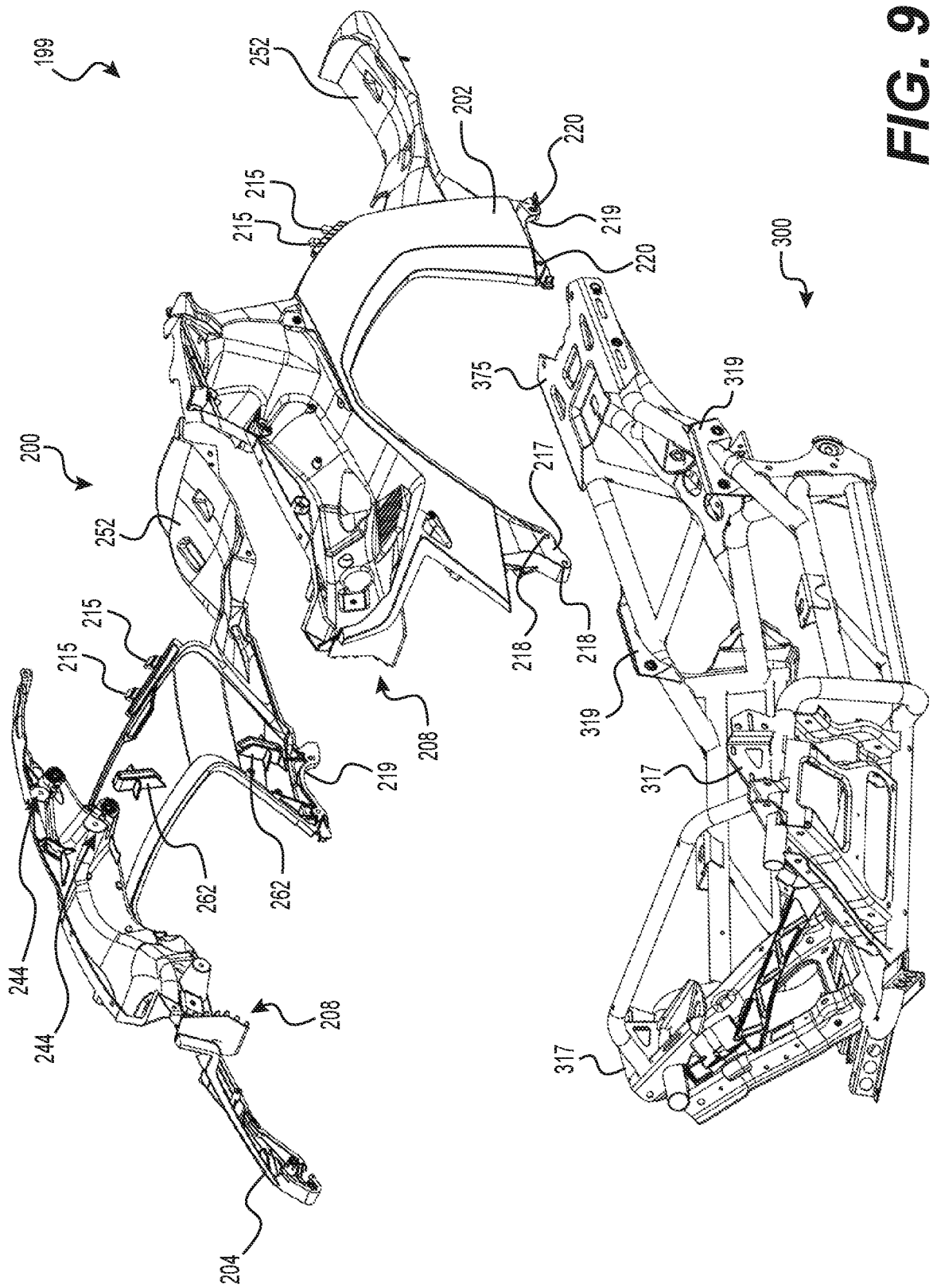
FIG. 9 is a partially exploded, front, left side perspective view of the frame of FIG. 7.

The frame 199 will now be described with reference to FIGS. 7 to 9. As mentioned above, the frame 199 is composed of the upper frame portion 200 and the lower frame portion 300. As can be seen in FIG. 8, the upper frame portion 200 has a center of gravity 299 which is disposed vertically higher than a center of gravity 399 of the lower frame portion 300. It should be noted that some parts of the upper frame portion 200 are disposed vertically lower than some parts of the lower frame portion 300, but a majority of the upper frame portion 200 is disposed above the lower frame portion 300. As mentioned above and as can be seen in FIG. 3, the center of gravity 191 of the power pack 190 is located generally above the lower frame portion 300 and forward of centers of gravity 299, 399 of the upper and lower frame portions 200, 300. As shown in FIG. 8, the center of gravity 191 of the power pack 190 is vertically higher than the center of gravity 399 of the lower frame portion 300 and vertically lower than the center of gravity 299 of the upper frame portion 200. It is contemplated that the center of gravity 191 of the power pack 190 could be located lower then the center of gravity 399 of the lower frame portion 300 in some implementations.

The parts of the upper frame portion 200 are molded from a fiber-reinforced thermoplastic material. In the present implementation, the fiber-reinforced thermoplastic material is specifically polypropylene with 10% glass fiber. This material, polypropylene with 10% glass fiber, has a density of 970 kg/m$^3$, a Young's modulus of 3.1 GPA; a Poisson's ratio of 0.4; and an elastic limit of 45.5 MPa. It is contemplated that the upper frame portion 200 could be made of a fiber-reinforced thermoplastic material having a higher or lower percentage of glass fiber. It is contemplated that the upper frame portion 200 could be made, in whole or in part, of a different plastic material, with more or less glass fiber reinforcement. It is also contemplated that the upper frame portion 200 could be molded from a different material, depending on specifics of the implementation. It is further contemplated that the parts of the upper frame portion 200 could be made from other composite materials that may or may not be molded.

The lower frame portion 300 is formed from a plurality of metal frame members welded together. In the illustrated implementation, the frame members are formed from HSLA steel. This material, HSLA (high-strength low-alloy) steel, has a density of 7800 kg/m$^3$, a Young's modulus of 200 GPA; a Poisson's ratio of 0.265 to 0.305; and an elastic limit of 340 MPa. It is contemplated that the lower frame portion 300 could be made, in whole or in part, of aluminum 6061 T6, which has a density of 2700 kg/m$^3$, a Young's modulus of 70 GPA; a Poisson's ratio of 0.33; and an elastic limit of 276 MPa. It is also contemplated that the lower frame portion 300 could be made, in whole or in part, of a different metal. It is further contemplated that the lower frame portion 300 could be made, in whole or in part, of a different material, provided the material has the properties necessary, as described below.

As can be seen from the two materials used to form the upper and lower frame portions 200, 300, the lower frame portion 300 is formed from a material having a higher density than the material forming the upper frame portion 200. In the present implementation, this results in the lower frame portion 300 being heavier than the upper frame portion 200, resulting generally in a lower center of gravity than if the entire frame was made of only one material.

As can be seen from the two materials used to form the upper and lower frame portions 200, 300, a yield strength of the material of the lower frame portion 300 is at least ten times a yield strength of the material of the upper frame portion 200. As can also be seen from the two materials used to form the upper and lower frame portions 200, 300, the Young's modulus of the material of the lower frame portion 300 is at least twenty times the Young's modulus of the material of the upper frame portion 200. In this specific implementation, the Young's modulus of the material of the lower frame portion 300 is at least fifty times the Young's modulus of the material of the upper frame portion 200. It is contemplated that the ratio of the Young's modulus of each material could be greater or smaller.

As can also be seen from the two materials used to form the upper and lower frame portions 200, 300, the Poisson's ratio of the material of the upper frame portion 200 is at least 1.3 times the Poisson's ratio of the material of the lower frame portion 300. It is contemplated that the ratio of the Poisson's ratio of each material could be greater or smaller depending on the implementation.

As can further be seen from the two materials used to form the upper and lower frame portions 200, 300, the density of the material of the lower frame portion 300 is at least 2.5 times the density of the material of the upper frame portion 200. In this specific implementation, the density of the material of the lower frame portion 300 is at least 7.5 times the density of the material of the upper frame portion 200.

The lower frame portion material is also composed of the stronger material in the present implementation, and as such, most of the load bearing mounts are a part of the lower frame portion 300. The upper frame portion 200 supports the seat 20, the steering column 44, the fuel tank 60, and the body panels 15.

The upper frame portion 200 and the lower frame portion 300 are fastened together to form the frame 199 of the vehicle 10. The upper frame portion 200 has two front connecting sections 217, each defining two through-holes 218, and two rear connecting sections 219, each defining two through-holes 220. The lower frame portion 300 similarly has two front connecting sections 317, each defining two through-holes, and two rear connecting sections 319, each similarly defining two through-holes. The upper and lower frame portions 200, 300 are then fastened together by bolts connected through the through-holes of the front connecting sections 217, 317 and the rear connecting sections 219, 319. It is contemplated that the bolts could be replaced with another type of fasteners.

Figure 10:
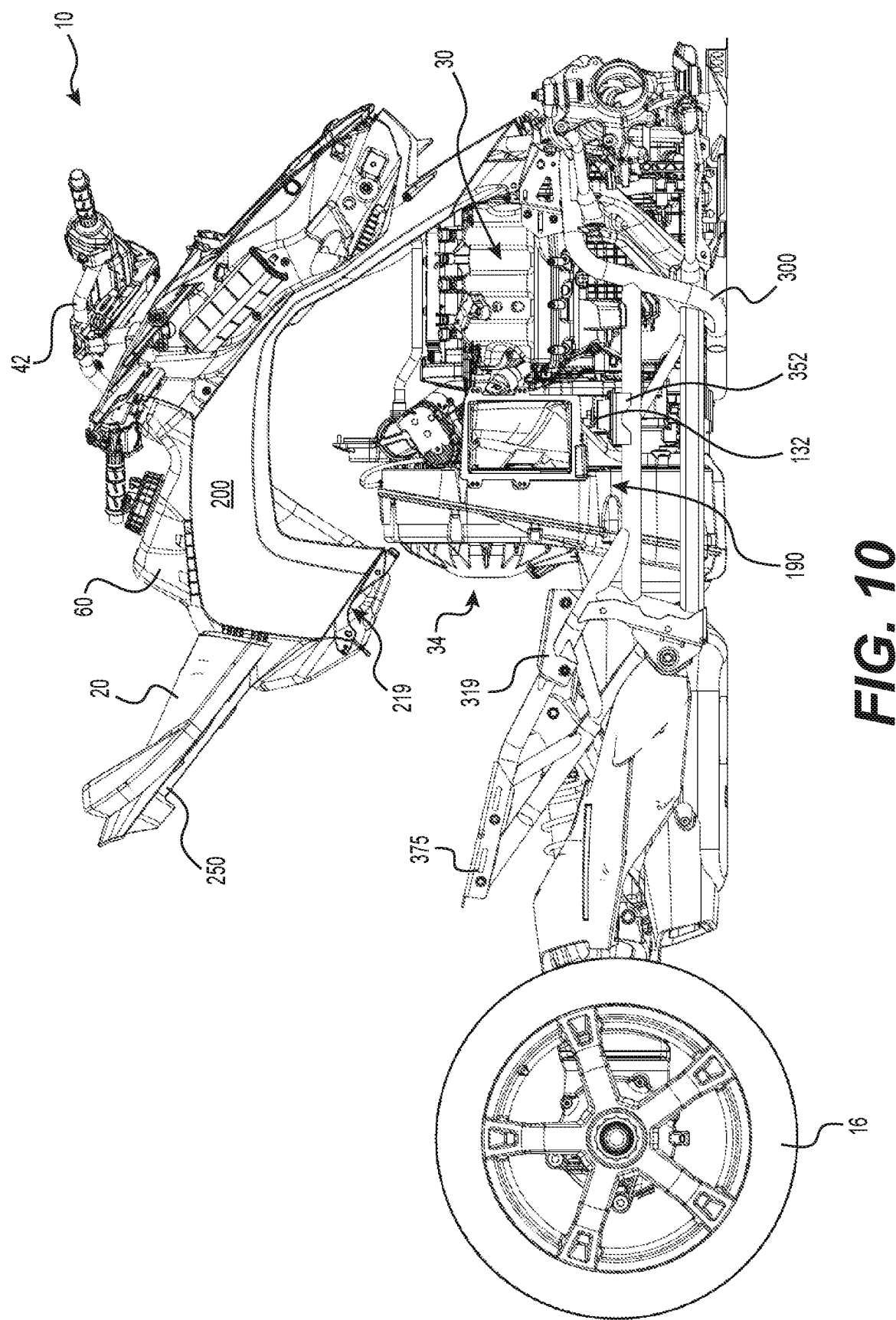
FIG. 10 is a right side elevation view of the vehicle of FIG. 1, with some portions having been removed, with an upper frame portion having been pivoted upward relative to a lower frame portion.
Figure 11:
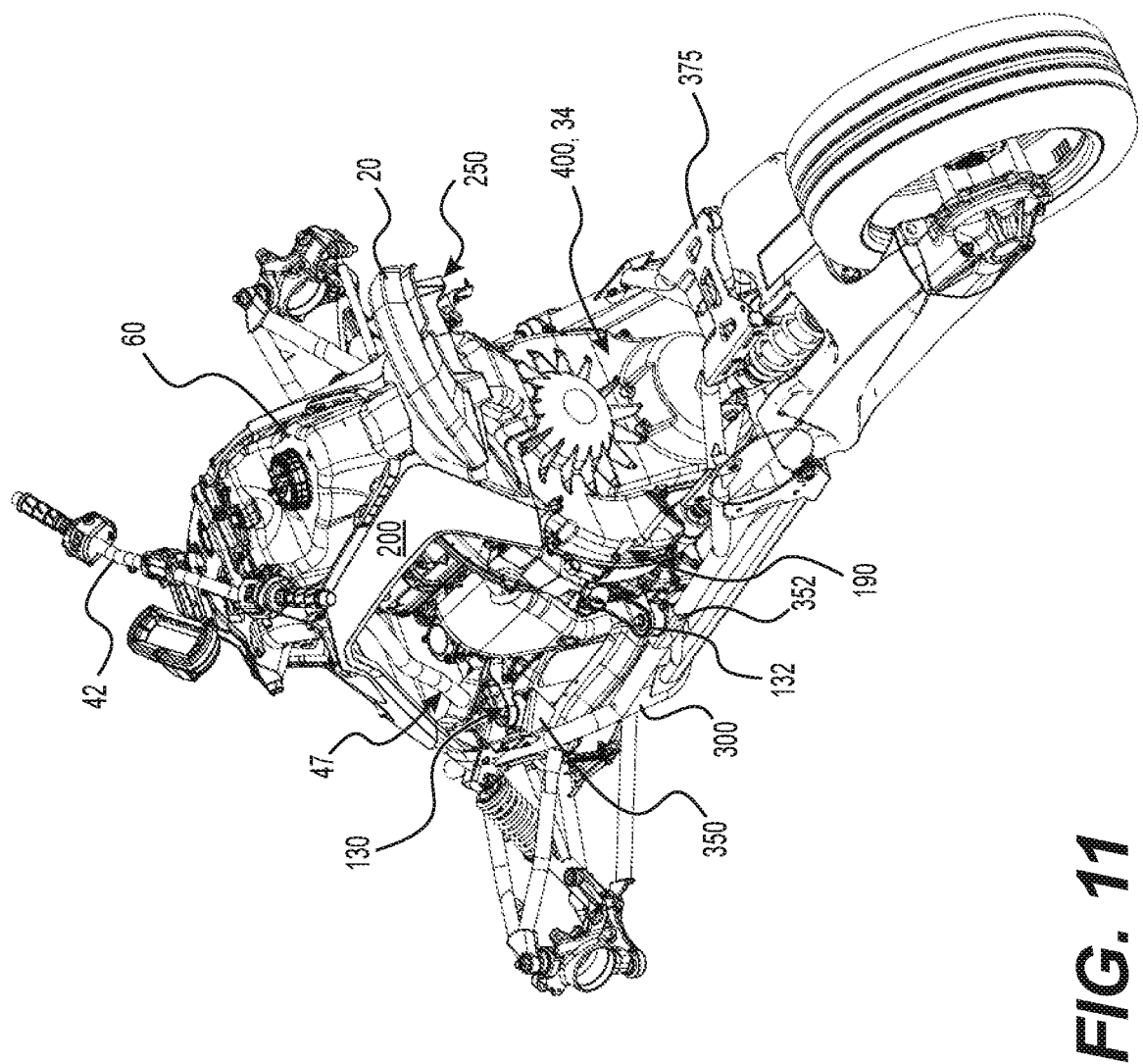
FIG. 11 is a top, rear, left side perspective view of the vehicle portions of FIG. 10 with the upper frame portion pivoted upward.

As can be seen in FIGS. 10 and 11, the upper frame portion 200 is selectively upwardly and forwardly pivotable with respect to the lower frame portion 300. First the bolts connecting the rear connecting sections 219, 319 and a rear-most bolt of the front connecting sections 217, 317 are removed. The remaining bolts of the front connecting sections 217, 317 are then loosened. The rear of the upper frame portion 200 can then be lifted upwardly and forwardly. As can be seen in the Figures, the handlebar 42 needs to be turned to its maximum leftward position in order to orient the steering column bottom portion 47 into a pivotable position, but it is contemplated that this may not be necessary, depending on specifics of a given implementation of the steering assembly 40.

Upon pivoting the upper frame portion 200 upwardly and forwardly pivotable with respect to the lower frame portion 300, the rear side of the power pack 190, including the CVT 34, is accessible, for example for repairs or upkeep. As the fuel tank 60 and the seat 20 are connected to and supported by the upper frame portion 200 (more details below), the seat 20 and the fuel tank 60 can be disposed rearward of the power pack 190, but need not be disconnected or removed from the vehicle 10 in order to access the rear side of the power pack 190, since they are moved upward along with the upper frame portion 200.

Figure 12:
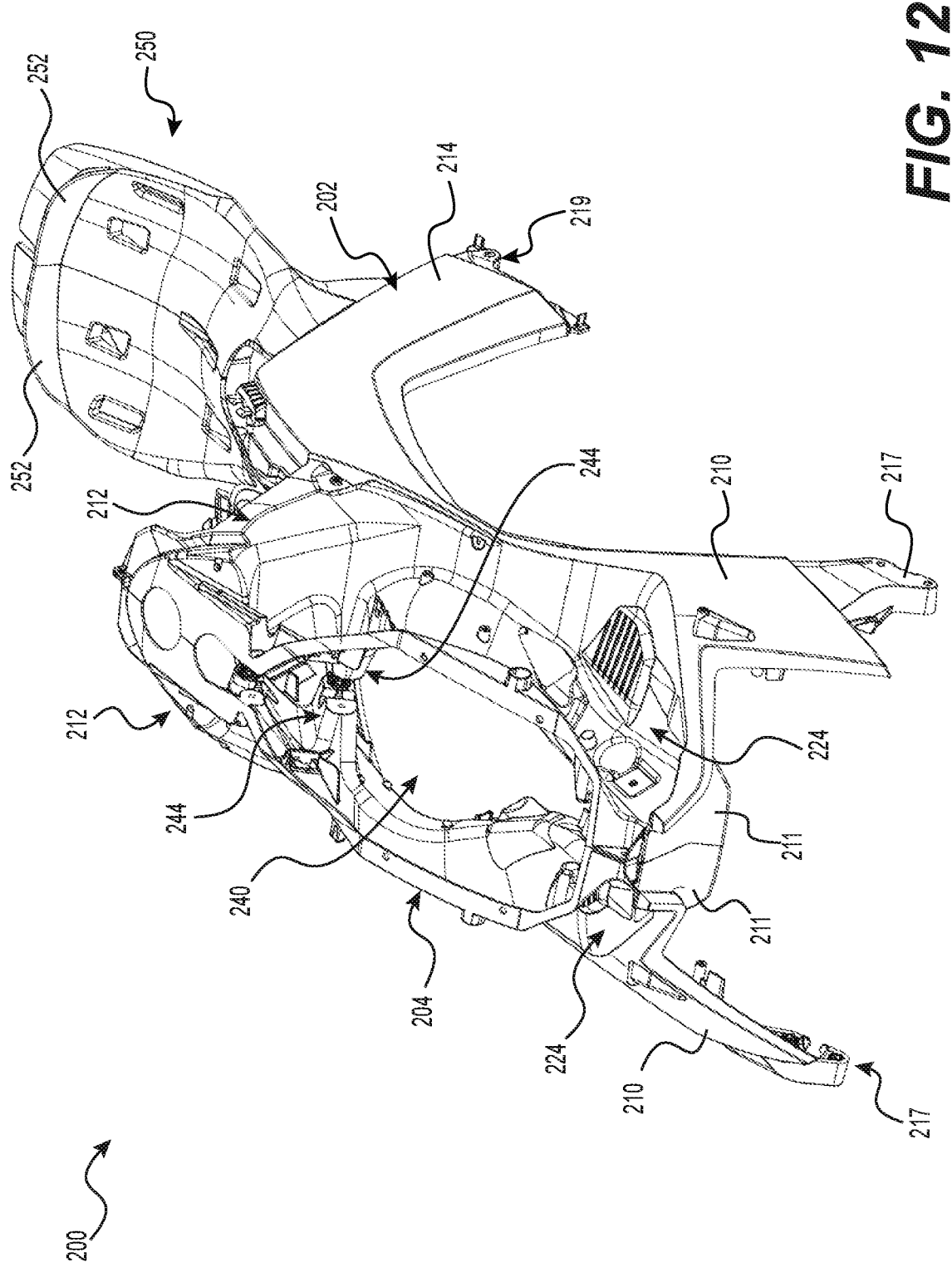
FIG. 12 is a top, front, left side perspective view the upper frame portion of the frame of FIG. 7.
Figure 13:
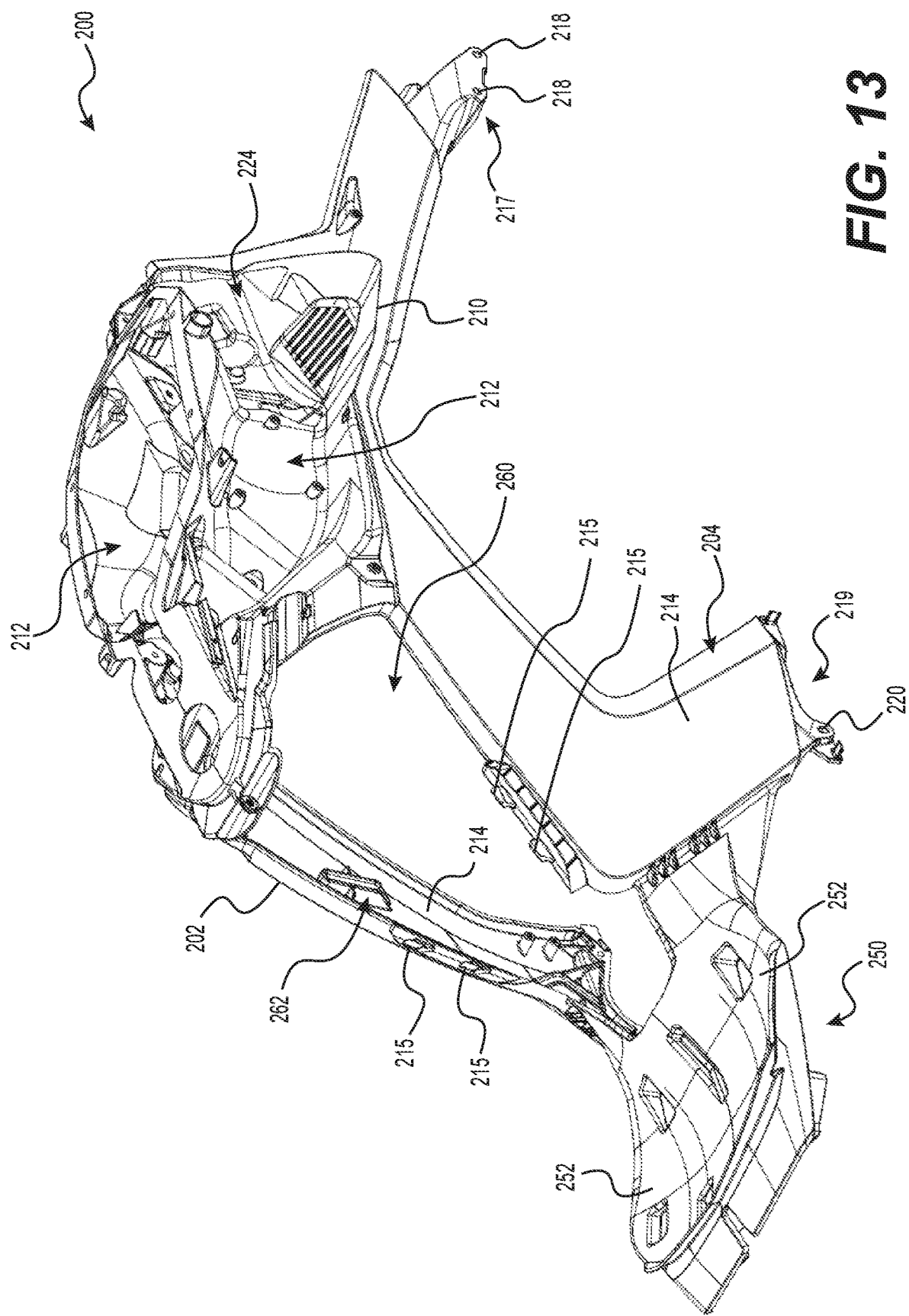
FIG. 13 is a top, rear, right side perspective view of the upper frame portion of FIG. 12.
Figure 14:
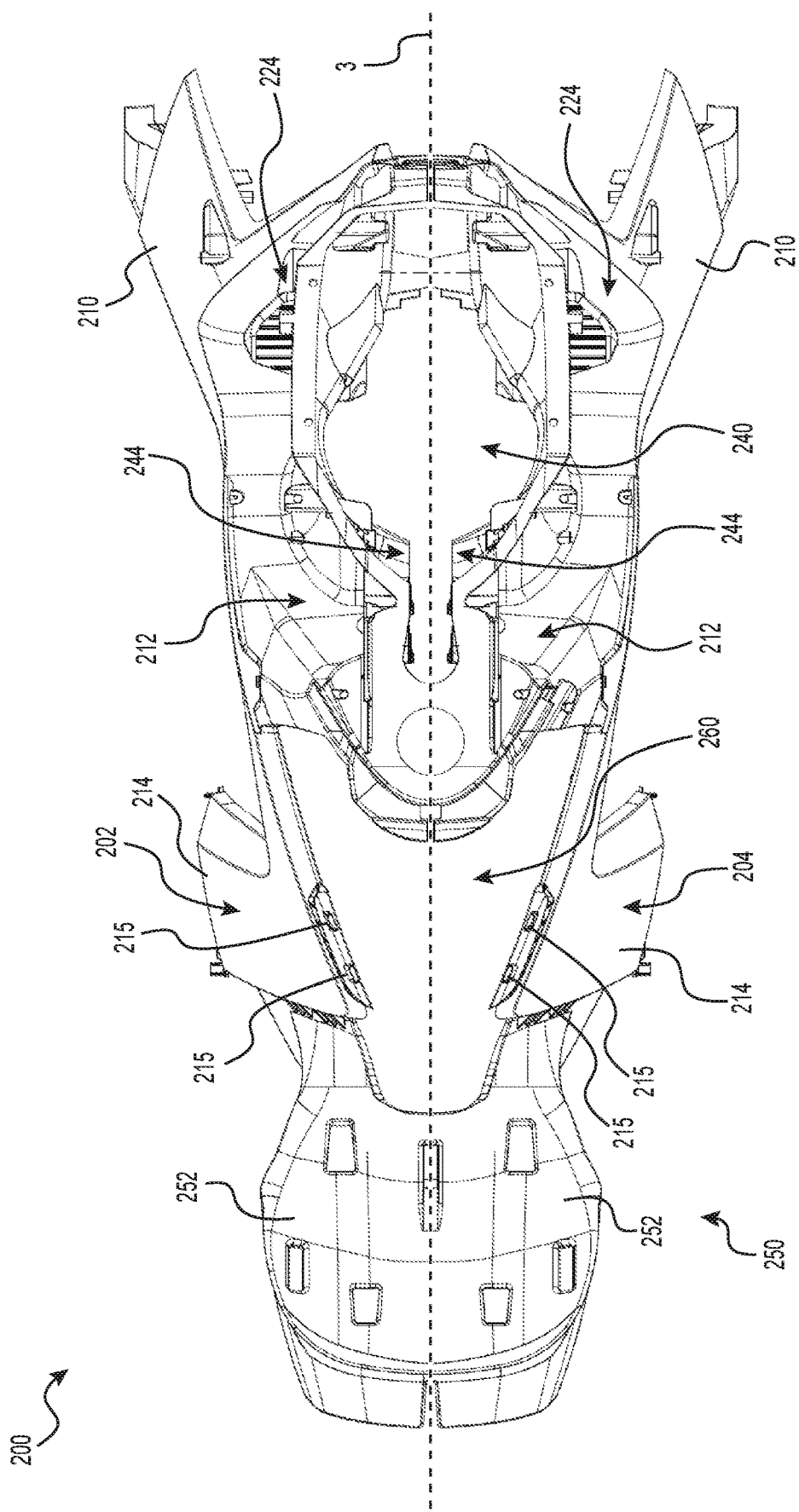
FIG. 14 is a top plan view of the upper frame portion of FIG. 12.

Details of the upper frame portion 200 will now be described with additional reference to FIGS. 12 to 14. For simplicity, all of the individual features of the upper frame portion 200 have been labeled only in FIGS. 12 to 14, while in the remaining figures, labels for some of the individual frame members have been omitted to avoid crowding the figures.

The upper frame portion 200 is made up of a left upper frame portion 202 and a right upper frame portion 204. As can be seen in FIG. 14, the left and right portions 202, 204 are fastened together along the centerline 3 of the vehicle 10. As can be seen in FIG. 9, the left and right portions 202, 204 each include interlocking teeth 208 for connecting and properly aligning the left and right upper frame portions 202, 204 together. Other than the teeth 208, the left and right upper frame portions 202, 204 are generally mirror images of each other, although it is contemplated that the left and right upper frame portions 202, 204 could not be mirror images of each other in some implementations.

The left and right upper frame portions 202, 204 each include a front leg portion 210, an apex portion 212, and a rear leg portion 214. The apex portions 212 are disposed generally over the power pack 190. The left and right apex portions 212 are bolted together, directly and in combination with the steering column 44 as is described below, to cover a top side of the power pack 190, as well as to aid in holding the left and right upper frame portions 202, 204 together.

As will be described below, the front and rear leg portions 210, 214 extend generally downward, longitudinally outward, and laterally outward from the apex portions 212, such that the upper from portion 200 has a generally pyramidal shape formed over the power pack 190. The sides of the upper frame portion 200 are generally open, allowing some access to the power pack 190 and other internal components.

The front leg portions 210 extend from a front side of the apex portions 212 forward, downward, and slightly laterally outward to the front connecting sections 217. As can be seen in FIG. 12, an inward extending portion 211 of each front left portion 210 extends laterally inward, the two extending portions 211 meeting along the centerline 3. The inward extending portions 211 are bolted together at a forward end of the power pack 190. In the present implementation, the left and right upper frame portions 202, 204 meet and connect in front of the engine 30.

The rear left portions 214 extend rearward from a rear side of the apex portions 212. The rear leg portions 214 are generally elbow-shaped, extending at first downward, rearward, and laterally inward from the apex portions 212. The rear leg portions 214 then bend further downward, laterally outward, and slightly forward from the bend to the rear connecting sections 219.

As mentioned above, the upper portion 45 of the steering column 44 is rotatably supported by the upper frame portion 200. Each of the apex portions 212 of the left and right portions 202, 204 includes a pair of laterally inwardly extending bosses 244 through which four fasteners can be passed. As can be seen in FIG. 6, a steering column support 46 connected to the upper portion 45 of the steering column 44 is sandwiched between the left and right pairs of laterally inwardly extending bosses 244. The steering column support 46 includes low friction sleeves (not shown) which allow the steering column 44 to turn with respect to the support 46. Four bolts (not shown) pass through the bosses 244 and the steering column support 46 to connect the left and right portions 202, 204 together, while also supporting the steering column 44. The steering column support 46 between the protrusions 244 rotatably holds the upper portion 45 of the steering column 44. It is contemplated that in some implementations the steering column support 46 could be integral with the upper frame portion 200. It is also contemplated that the steering column 44 could pass through one or the other of the left and right portions 202, 204 rather than between the left and right portions 202, 204.

Between the left and right upper frame portions 202, 204, the upper frame portion 200 defines a recess 240 for receiving a storage bin 17. Specifically, the recess 240 is defined between the apex portions 212 and the inward extending portions 211 of the front left portions 210. As can be seen in FIGS. 1 and 2, where the storage bin 17 is shown as installed in the upper frame portion 200, the storage bin 17 includes a pivotable cover for selectively closing and selectively accessing the storage bin 17. It is contemplated that the storage bin 17 could be formed integrally with the upper frame portion 200. It is also contemplated that the storage bin 17 could be omitted in some implementations of the vehicle 10.

Between the rear leg portions 214 of the left and right upper frame portions 202, 204, the upper frame portion 200 defines a recess 260 for receiving and supporting the fuel tank 60. On the inner surfaces of the left and right rear leg portions 214, there are four tabs 262 for connecting the fuel tank 60 to the upper frame portion 200 in the recess 260. There are two support structures in the form of tabs 262 on each of the left and right rear leg portions 214, the right two tabs 262 being shown in FIG. 9. As mentioned above, the fuel tank 60 is connected to and supported by the upper frame portion 200 rearward of the power pack 190, such that the fuel tank 60 does not need to be disconnected or removed from the vehicle 10 in order to access the rear side of the power pack 190. It is contemplated that the fuel tank 60 could be supported by the lower frame portion 300.

As is shown in FIGS. 1 and 2, the upper frame portion 200 further supports a fuel filler cover 19 on the left and right apex portions 210. The fuel filler cover 19 covers the fuel filler neck opening 66 to both hide the fuel filler neck opening 66 for aesthetic reasons and to provide some protection to the fuel filler neck opening 66 from the environment. The fuel filler cover 19 translates rearward, away from the steering column 44 and towards a rider seated in the straddle seat 20, allowing access to the fuel filler neck opening 66 in order to refill the fuel tank 60. It is contemplated that the fuel filler cover 19 could be provided with a lock. It is also contemplated that the fuel filler cover 19 could be omitted from the vehicle 10 in some implementations. In some implementations, the neck opening 66 could be closed by a fuel cap.

The upper frame portion 200 supports the body panels 15 of the vehicle 10 (see FIGS. 1 and 2 as well) which enclose and protect the internal components of the vehicle 10 to increase streamlining, guide air into or through the vehicle, and/or improve the vehicle's appearance. At least some of the body panels 15 provide, for all practical purposes, no structural benefit, that is to say that they do not noticeably increase the rigidity of the upper or lower frame portions 200, 300, and can therefore be qualified as "non-structural". An example of a non-structural panel are the body panels 15 that surrounds the headlights which are themselves mounted to the upper frame portion 200 but to which no other vehicle component is mounted. The body panels 15 are connected to and supported by the upper frame portion 200. The upper frame portion 200 includes several tabs 215 for aiding in the alignment and connection of the body panels 15 to the upper frame portion 200. Four tabs 215 have been illustrated in the drawings, specifically two tabs 215 on each of the left and right rear leg portions 214, for connecting the body panels 15 for covering the fuel tank 60. It is contemplated however that the upper frame portion 200 could include more or fewer tabs 215 for connecting body panels 15. It is also contemplated that the vehicle 10 could include more or fewer body panels 15 than illustrated. It is contemplated that the body panels 15 could be attached in various ways, alone or in combination, such as tabs, snaps, screws, bolts, clips, rivets, latches and the like.

As the upper frame portion 200 is made from a fiber-reinforced plastic material that can be molded to shape, some of the upper frame portion 200 itself includes aesthetic surfaces that serve both structural and visual functions. As can be seen in the Figures, laterally exterior sides of the front and rear leg portions 210, 214 have surfaces shaped similarly to body panels, and indeed are not covered by body panels 15 when the vehicle 10 is fully assembled (see FIG. 1). It is contemplated that the front and rear leg portions 210, 214 could include larger or smaller aesthetic surfaces. It is also contemplated that the upper frame portion 200 could omit all portions which are purely aesthetic in some implementations. It is further contemplated that the upper frame portion 200 could provide all cover necessary for the internal components and the body panels 15 could be omitted in such implementations.

The upper frame portion 200 also defines two recesses 224 for receiving the headlights 24 therein. Specifically, the left front leg portion 210 defines a left recess 224 and the right front leg portion 210 defines a right recess 224. The headlights 24 are connected to and supported by the upper frame portion 200 when the headlights 24 are installed in the recesses 224. The recesses 224 define a space large enough to receive the headlights 24 therein, as well as electrical connections (not shown) necessary to power and control the headlights 24. It is contemplated that additional components could be received in the recesses 224.

The upper frame portion 200 includes a seat portion 250. Each of the left and right upper frame portions 202, 204 includes a seat part 252 that extends generally horizontally and rearward from a rear side of the rear leg portion 214 of the corresponding left or right upper frame portion 202, 204. The left and right upper frame portions 202, 204 are joined together at the left and right seat parts 252. The left and right seat parts 252 together define the seat portion 250. The seat 20 is connected to and supported by the seat portion 250 and is designed to carry the driver of the vehicle 10. It is contemplated that the seat 20 could be formed to accommodate the driver and one additional rider (the passenger). As mentioned above, the seat 20 is connected to and supported by the upper frame portion 200 rearward of the power pack 190, such that the seat 20 does not need to be disconnected or removed from the vehicle 10 in order to access the rear side of the power pack 190.

Details of the lower frame portion 300 will now be described with reference to FIGS. 15 to 19. For simplicity, all of the individual frame members of the lower frame portion 300 have been labeled only in FIGS. 15 to 19. In the remaining figures, the lower frame portion 300 has been indicated generally but the specific labels for some of the individual frame members have been omitted to avoid crowding the figures.

The lower frame portion 300 includes a front frame portion 302, a central frame portion 304, and a rear frame portion 306. The front frame portion 302 is generally the area of the lower frame portion 300 to which is mounted the front suspension assemblies 70 and where the lower frame portion 300 supports the radiator 52 and the steering assembly 40, and connects to the front connecting sections 217 of the upper frame portion 200. The front frame portion 302 also generally surrounds the engine 30. The central frame portion 304 is the area of the lower frame portion 300 that generally surrounds the CVT 34 and the transfer case 36. The front and central frame portions 302, 304 generally define an engine cradle 390, the power pack 190 being disposed in the engine cradle 390. The rear frame portion 306 is generally the area of the lower frame portion 300 to which is mounted the rear suspension assembly 80 and where the lower frame portion 300 supports the exhaust assembly and connects to the rear connecting sections 219 of the upper frame portion 200. It is contemplated that in some implementations the rear frame portion 306 could include a seat portion for receiving and connecting the seat 20 thereto.

The front frame portion 302 includes a U-shaped lower frame member 303 formed of a tubular brace. The U-shaped frame member 303 has a left arm 307 and a right arm 307, each extending generally horizontally, rearwardly and laterally outwardly from a central portion of the member 303. As can be seen best in FIG. 16, a middle cross-member 312 extends generally laterally between rear portions of the U-shaped frame member 303. The middle cross-member 312 is slightly V-shaped, with a central portion of the middle cross-member 312 extending farther rearward than the left and right ends of the middle cross-member 312. The middle cross-member 312 aids in enhancing rigidity of the lower frame portion 300.

The front frame portion 302 also includes a left frame member 318 and a right frame member 318 extending above the lower frame member 303. A vertical portion 324 of each of the members 318 extends generally upwardly from the lower frame member 303 near the rear ends thereof. The frame members 318 each have a horizontal portion 322 extending forwardly and laterally inwardly from the vertical portion 324. The right arm 318 is a mirror-image of the left arm 318, although it is contemplated that it may not be in some implementations.

The front frame portion 302 further includes the two radiator supporting brackets 305. The radiator supporting brackets 305 extend forward and laterally outward from the frame member 303. The radiator 52 is fastened to the radiator supporting brackets 305 such that the weight of the radiator 52 is supported by the lower frame portion 300.

The front frame portion 302 also includes a left front suspension mounting bracket 330 and a right front suspension mounting bracket 330. The right front suspension mounting bracket 330 is generally a mirror image of the left front suspension mounting bracket 330, and as such, only the left front suspension mounting bracket 330 will be described herein. The left front suspension mounting bracket 330 includes two vertical members 332 connected together by three cross-members 334 extending horizontally therebetween. The members 232, 234 are formed by stamping metal sheets. The upper ends of the front and rear vertical members 232 are connected to the horizontal portion 322 of the left arm 318. The lower ends of the vertical members 232 are connected to the left arm 307 of the U-shaped frame member 303. Bolt holes 336 are defined in each of the front and rear vertical members 332 for pivotally connecting the lower A-arm 74 of the left front suspension 70. Bolt holes 338 are defined in each of the front and rear vertical members 332 near their respective upper ends for connecting the upper A-arm 72 of the left front suspension 70.

A left shock absorber mounting bracket 340 is connected to the horizontal portion 322 of the left arm 318 between the front and rear vertical members 332 for connecting the upper end of the shock absorber 76 of the left front suspension assembly 70. The right shock absorber mounting bracket 340 is generally a mirror image of the left shock absorber mounting bracket 340, and as such, will not be described herein.

The left shock absorber mounting bracket 340 extends upwardly and laterally outwardly from the horizontal portion 322. The left shock absorber mounting bracket 340 is U-shaped in cross-section with two spaced apart generally planar flanges. The flanges extend parallel to one another. Another planar flange extends between the two parallel flanges, with a through-hole defined in each of the two parallel flanges. The upper end of the shock absorber 76 is pivotally connected to the shock absorber mounting bracket 340 by a bolt inserted through the through-holes and the upper end of the shock absorber 76 disposed therebetween. A right shock absorber mounting bracket 340 is similarly connected to the horizontal portion 322 of the right arm 318 between the front and rear vertical members 332 for connecting the upper end of the shock absorber 76 of the right front suspension assembly 70.

The front frame portion 302 also includes an upper cross-member 316 extending laterally between forward portions of the horizontal portions 322 of the left and right frame members 318. Generally forward and below the upper cross-member 316, the front frame portion 302 also includes a steering supporting member 314. The steering supporting member 314 is connected to and extends between the left and right front suspension mounting brackets 330. As can be seen in FIGS. 4 and 6, the bottom portion 47 of the steering column 44 is pivotably connected to a left end portion of the steering supporting member 314.

The front frame portion 302 includes a front left bracket 350 and a front right bracket 350 connected to and extending inward from the frame members 318. The front right bracket 350 is generally a mirror image of the front left bracket 350, but it is contemplated that the brackets 350 could not be mirror images in some implementations. The brackets 350 are stamped metal sheets welded to the horizontal portion 322. A front portion of the engine 30 is connected to the left and right brackets 350 by vibration absorbing mounts 130 as will be described below in further detail.

The central frame portion 304 of the lower frame portion 300 includes a lower left frame member 360 extending rearwardly from the left frame member 318 and a lower right frame member 360 extending rearwardly from the right frame member 318. The central frame portion 304 also includes a left rear vertical member 372 extending vertically upward from the lower left frame member 360 and a right rear vertical member 372 extending vertically upward from the lower right frame member 360. The lower left frame member 360 is formed of a tubular brace and extends generally horizontally. From the front end, the lower left frame member 360 extends generally horizontally and laterally inwardly towards the left rear vertical member 372. The lower right frame member 360 is generally a mirror image of the lower left frame member 360, and as such, only the lower left frame member 360 will be described herein. The left and right driver footrests 26 are connected to the lower left and right frame members 360 respectively.

The lower frame portion 300 includes a left swing arm bracket 362 connected to and extending rearward from the left rear vertical member 372 and a right swing arm bracket 362 connected to and extending rearward from the right rear vertical member 372.

The left and right swing arm brackets 362 are U-shaped in cross-section with two spaced apart generally planar flanges extending parallel to one another and another planar flange extending between the two parallel flanges. A through-hole is defined in each of the two parallel flanges. The right side of the swing arm 82 and the right swing arm bracket 362 are illustrated in FIG. 3. The swing arm 82 is pivotally connected to the left and right swing arm brackets 362 by a bolt inserted through the through-holes and the front left and right ends of the swing arm 82 disposed therebetween.

The central frame portion 304 also includes a left upper frame member 370 disposed above the lower left frame member 360 and a right upper frame member 370 disposed above the lower right frame member 360. Front ends of the left and right members 370 are welded between the left and right frame members 318 and the left and right frame members 372, above and parallel to the frame members 360. For additional support in the central frame portion 304, a left diagonal member 365 is welded to and extends diagonally between the lower left frame member 360 and the left rear upper frame member 370 and a right diagonal member 365 is welded to and extends diagonally between the lower right frame member 360 and the right rear upper frame member 370.

The central frame portion 304 further includes a rear left bracket 352 connected to the left frame member 370 and a rear right bracket 352 connected to the right frame member 370. The power pack 190, specifically via the transfer case 36, is mounted to the rear left and right brackets 352 as will be described below in further detail.

Figure 18:
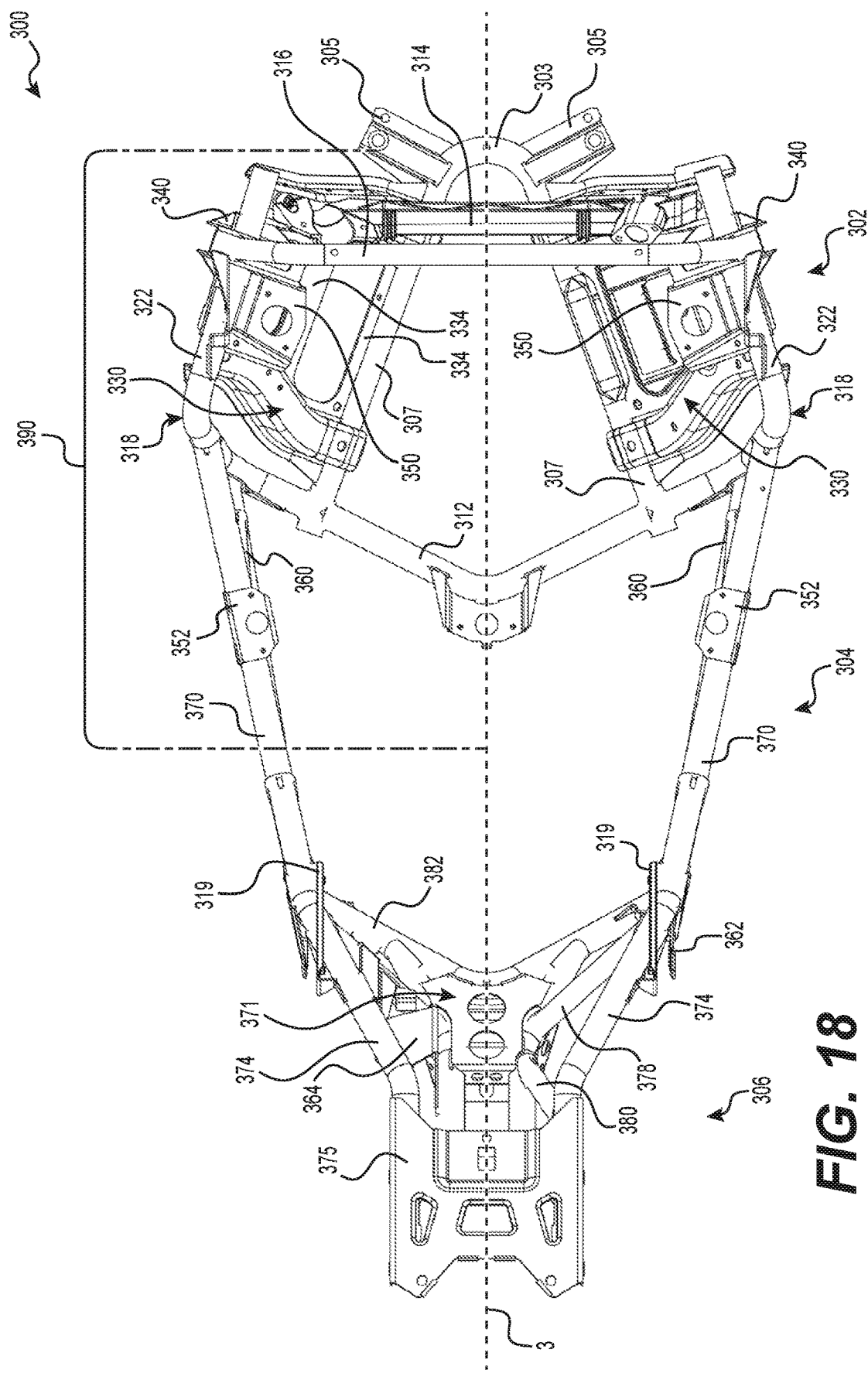
FIG. 18 is a top plan view of the lower frame portion of FIG. 15.

As is highlighted in FIG. 18, the front and central frame portions 302, 304 of the lower frame portion 300 define the engine cradle 390 where the engine 30 is supported by the lower frame portion 300. As the engine 30 and the transmission assembly 400 are rigidly connected together, the entire power pack 190 is thus supported by the lower frame portion 300 in the engine cradle 390. The power pack 190 is disposed in the engine cradle 390 and mounted to the lower frame portion 300 via the front left and right brackets 350 in the front frame portion 302 and the rear left and right brackets 352 in the central frame portion 304.

As can be seen in FIGS. 5 and 11, a front portion of the engine 30 (and thus the power pack 190) is mounted to the front left and right engine mounting brackets 350 of the lower frame portion 300 by a front left vibration absorbing mount 130 and a front right vibration absorbing mount 130 respectively. Specifically, near a front of the engine 30, the power pack 190 includes two vibration absorbing mounts 130 which extend from left and right sides of the engine 30. Each mount 130 includes at least a bracket 128 and a vibration absorbing element 129. The bracket 128 has a horizontally extending flange to which the vibration absorbing element 129 is connected. The bracket 128 is made of metal or other suitable material. The vibration absorbing element 129 is in the form of a ring made of rubber. It is contemplated that the vibration absorbing element 129 could be made of other suitable material. The vibration absorbing element 129 is commonly also referred to as a "motor mount".

The left and right vibration absorbing elements 129 are sandwiched between the left and right front brackets 350 and the left and right brackets 128 in order to isolate the power pack 190 from the lower frame portion 300 (and thus the whole frame 199). Bolts (not shown) connect the vibration absorbing elements 129 to the brackets 128 and the vibration absorbing elements 129 are connected to the front brackets 350 of the lower frame portion 300 by other bolts (not shown).

It is contemplated that the front portion of the engine 30 and the power pack 190 could be mounted to the lower frame portion 300 by a single bracket 350 disposed laterally centrally and a single mount 130 including a single vibration absorbing element 129 rather than the pair of left and right brackets 350 and the corresponding pair of left and right mounts 130 as shown herein. It is also contemplated that the front portion of the engine 30 and the power pack 190 could be mounted to the lower frame portion 300 by more than two brackets 350. It is further contemplated that the power pack 190 could be mounted to the lower frame portion 300 by more than four brackets 350, 352. It is contemplated that the power pack could be directly attached to the lower frame portion 300 and that the vibration absorbing mounts 130 could be omitted.

With continued reference to FIGS. 5 and 11, a rear portion of the power pack 190 is supported on the rear brackets 352 in a rear portion of the engine cradle 390. The left side of the transfer case housing 140 is connected to the rear left bracket 352 of the lower frame portion 300 using a left vibration absorbing mount 132 and a right side of the transfer case housing 140 is connected to the rear right bracket 352 of the lower frame portion 300 using a right vibration absorbing mount 132.

As with the vibration absorbing mounts 130, the vibration absorbing mounts 132 each include a bracket 134 and a vibration absorbing element 135. The vibration absorbing elements 135 are disposed on the rear brackets 352. The vibration absorbing mounts 132 are secured to the rear brackets 352 in the same manner as described above for the front left and right mounts 130.

In the illustrated implementation of the vehicle 10, the components of the powertrain 100, i.e., the engine 30, the CVT 34 and the transfer case 36, are all secured to the lower frame portion 300 via the four mounting points provided by the brackets 350, 352. It is contemplated that the CVT housing 150 and/or a rear portion of the engine 30 could be secured to the lower frame portion 300 instead of the transfer case housing 140. It is also contemplated that the rear portion of the engine 30 and/or the CVT housing 150 could be connected to the lower frame portion 300 in addition to the transfer case housing 140.

The rear frame portion 306 of the lower frame portion 300 extends upward and rearward from the central frame portion 304. It is contemplated that some specific frame members of the rear frame portion 306 of the lower frame portion 300 could be omitted or differently shaped in some implementations of the present technology.

The rear frame portion 306 includes a rear left upper frame member 374 and a rear right upper frame member 374. The rear right upper frame member 374 is generally a mirror image of the rear left upper frame member 374 and as such, only the left member 374 will be described herein. The front end of the left member 374 is connected to the left rear upper frame member 370. From the front end, the left member 374 extends generally upward, rearward, and laterally inwardly from the left member 370. Rearward from the front end, the left member 374 is connected to and supported by a top end of the left member 372. The left and right members 374 are formed from tubular braces and are welded to the left and right members 370.

Figure 15:
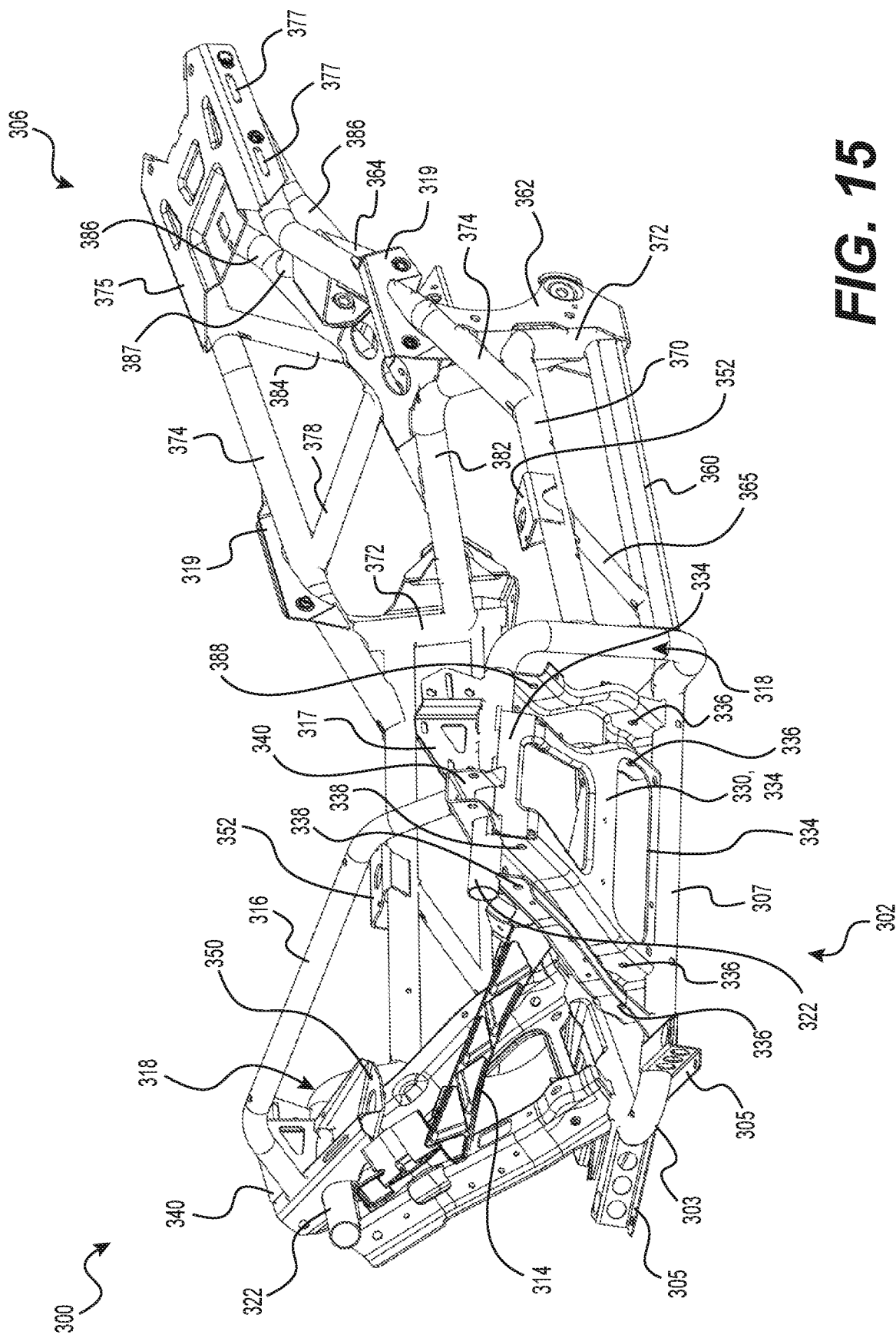
FIG. 15 is a front, left side perspective view of the lower frame portion of the frame of FIG. 7.
Figure 16:
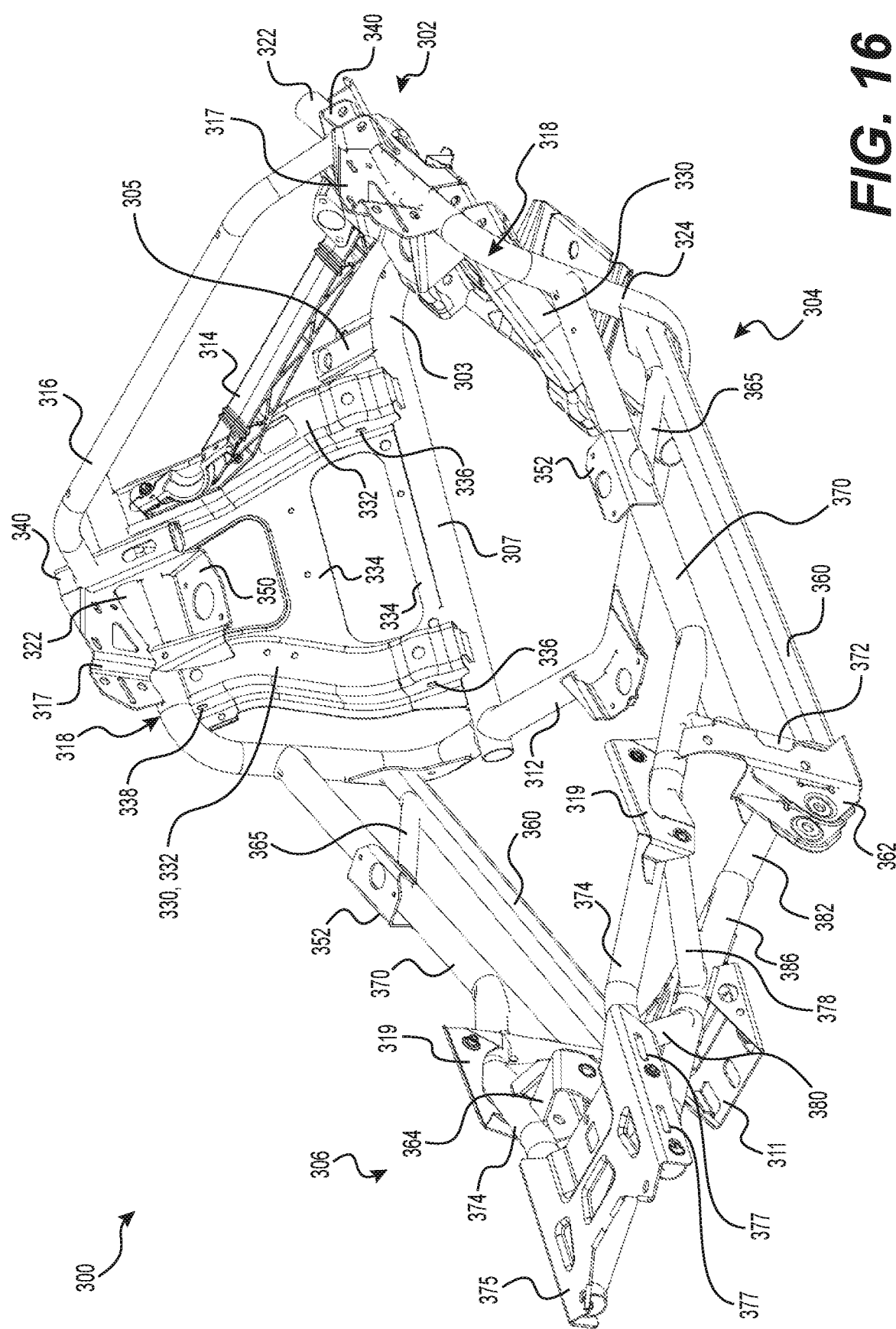
FIG. 16 is a rear, right side perspective view of the lower frame portion of FIG. 15.
Figure 17:
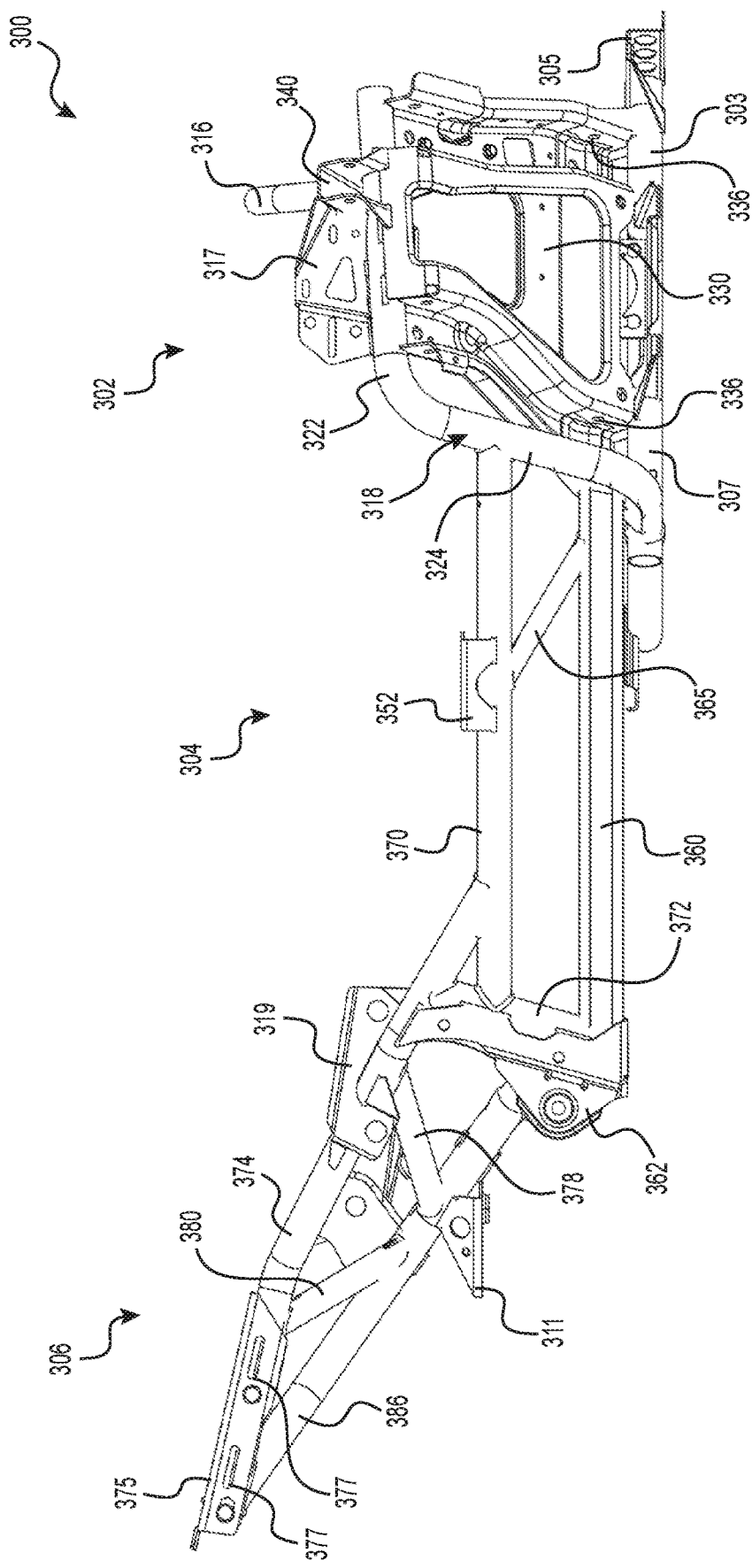
FIG. 17 is a right side elevation view of the lower frame portion of FIG. 15.

Rear portions of the left and right members 374 are connected to and support a lower seat portion 375. When the upper and lower frame portions 200, 300 are assembled to form the frame 199, the lower seat portion 375 is disposed below and in contact with the upper seat portion 250 (although not connected thereto) for aiding in supporting the weight of the driver when the driver is sitting on the seat 20. As can be seen in FIGS. 15 to 17, the lower seat portion 375 defines four seat extension apertures 377 (two on each of the right and left sides). The apertures 377 are adapted to receive fasteners from a passenger seat extension (not shown). The passenger seat extension is selectively fastened to the lower seat portion 375 for accommodating a passenger on the vehicle 10. The lower frame portion 300 thus at least partially supports the weight of the passenger when the passenger seat extension is installed and the passenger is sitting thereupon. It is contemplated that the seat 20 could be connected to and supported directly by the lower seat portion 375 of the lower frame portion 300 in some implementations, where the seat portion 250 may be omitted, for example. It is also contemplated that the seat 20 could be connected to and supported entirely by the upper seat portion 250 and that the lower seat portion 375 could be omitted.

Figure 19:
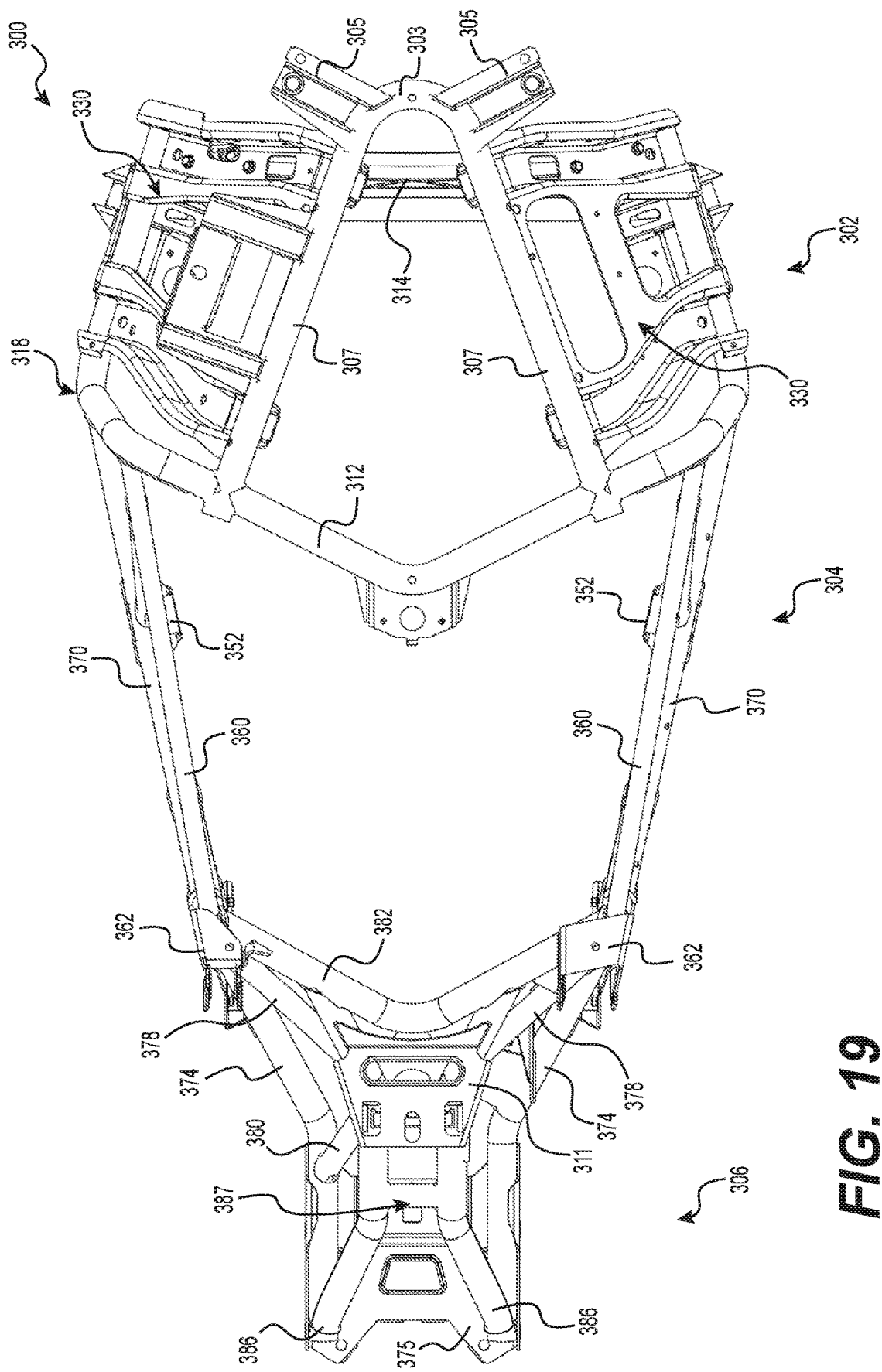
FIG. 19 is a bottom plan view of the lower frame portion of FIG. 15.

As can be seen best in FIGS. 15 and 19, a rear cross-member 382 extends generally laterally between the left and right rear vertical members 372. The rear cross-member 382 has a left end connected to the left member 372 and a right end connected to the right members 372. The rear cross-member 382 is slightly v-shaped, with a central portion of the rear cross-member 382 extending farther rearward than the left and right ends of the rear cross-member 382. The rear cross-member 382 aids in enhancing rigidity of the lower frame portion 300.

The rear frame portion 306 also includes a rear left middle frame member 386 and a rear right middle frame member 386. The rear right middle frame member 386 is generally a mirror image of the rear left middle frame member 386 and as such, only the left member 386 will be described herein.

The front end of the left member 386 is connected to the rear cross-member 382. From the front end, the left member 386 extends generally upward, rearward, and laterally inwardly from the rear cross-member 382 to a central portion of the left member 386. From the central portion, the left member 386 extends rearward, upward, and laterally outward. At its rear end, the left member 386 is connected to the rear left upper frame member 374, under the lower seat portion 375. A cross-member 387 connects the left and right members 386 at their central portions, such that the left and right members 386 and the cross-member 387 form an "H" shaped structure. The left and right members 386 are formed from tubular braces and are welded to the left and right members 374 and the rear cross-member 382.

As can best be seen in FIGS. 17 and 19, the rear frame portion 306 also includes the muffler bracket 311 connected to and extending rearward from the rear left and right middle frame members 386. The muffler bracket 311 is formed by a stamped metal sheet. A front portion of the muffler bracket 311 is connected to the left and right members 386 by welding. A front portion of the muffler 450 is connected to the muffler bracket 311 such that the muffler 450 is disposed generally below the seat 20, as mentioned above. It is contemplated that the muffler bracket could be connected to a frame member in the central frame portion 304 in some implementations where the rear frame portion 306 is removed or reduced.

The rear frame portion 306 also includes a plate 371 which aids in increasing structural strength of the rear frame portion 306. The plate 371 is formed by a stamped metal sheet. The plate 371 is connected to a top side of the left and right members 386 and the rear cross-member 382 by welding. It is contemplated that the plate 371 could be omitted in some implementations.

The rear frame portion 306 further includes three diagonal members for additional structural strength. A left diagonal member 378 is welded to and extends diagonally between the rear left upper frame member 374 and the rear left middle frame member 386 and a right diagonal member 378 is welded to and extends diagonally between the rear right upper frame member 374 and the rear right middle frame member 386. An additional right diagonal member 380 (FIG. 19) is welded to and extends diagonally between the rear right upper frame member 374 and the rear right middle frame member 386.

The rear frame portion 306 also includes a rear shock absorber mounting bracket 364 connected to the rear left upper frame member 374 for connecting the upper end of the shock absorber 84 of the rear suspension assembly 80. The rear shock absorber mounting bracket 364 is connected to the lower surface of the rear left upper frame member 374. The rear shock absorber mounting bracket 364 is disposed opposite the right diagonal member 380, there being no corresponding left diagonal member so that the rear frame portion 306 can accommodate the rear shock absorber mounting bracket 364. The rear shock absorber mounting bracket 340 is U-shaped in cross-section with two spaced apart generally planar flanges extending parallel to each another and another planar flange extending between the two parallel flanges. A through-hole is defined in each of the two parallel flanges. The upper end of the rear shock absorber 84 is pivotally connected to the rear shock absorber mounting bracket 364 by a bolt inserted through the through-holes and the upper end of the rear shock absorber 84 disposed therebetween.

The vehicle 10 implemented in accordance with some non-limiting implementations of the present technology can be represented as presented in the following numbered clauses.

CLAUSE 1: A vehicle (10) comprising: a frame (199) comprising: a lower frame portion (300) made from a first material, and an upper frame portion (200) connected to the lower frame portion (300), the upper frame portion (200) being made from a second material different from the first material, a center of gravity (299) of the upper frame portion (200) being above a center of gravity (399) of the lower frame portion (300); at least one front suspension system (70) connected to the lower frame portion (300); at least one front ground engaging member (14), the at least one ground engaging member (14) being operatively connected to the at least one front suspension system (70); at least one rear suspension system (80) connected to the lower frame portion (300); at least one rear ground engaging member (16) operatively connected to the at least one rear suspension system (80); a power pack (190) for providing power to at least one of the at least one front ground engaging member (14), and the at least one rear ground engaging member (16), the power pack (190) being connected to and supported by the lower frame portion (300); at least one seat (20) connected to and supported by at least one of the upper frame portion (200) and the lower frame portion (300); and at least one body panel (15) connected to and supported by the upper frame portion (200).

CLAUSE 2: The vehicle (10) of clause 1, wherein the first material has a higher density then the second material.

CLAUSE 3: The vehicle (10) of clause 1 or 2, wherein a center of gravity (191) of the power pack (190) is above the center of gravity (399) of the lower frame portion (300).

CLAUSE 4: The vehicle (10) of any one of clauses 1 to 3, further comprising a steering system (40) operatively connected to the at least one front ground engaging member (14) for steering the vehicle (10), the steering system (40) including a steering column (44) rotatably supported by the upper frame portion (200).

CLAUSE 5: The vehicle (10) of clause 4, wherein: the steering column (44) is rotatably connected to the upper frame portion (200) at an upper portion (45) of the steering column (44); a bottom portion (47) of the steering column (44) is pivotally connected to the lower frame portion (300); and the steering column (44) extends upward and rearward from the bottom end (47) of the steering column (44) to the upper portion (45) of the steering column (44).

CLAUSE 6: The vehicle (10) of any one of clauses 1 to 5, wherein: the power pack (190) comprises: an internal combustion engine (30), and a transmission system (400); and the internal combustion engine (30) and the transmission system (400) are rigidly connected to each other.

CLAUSE 7: The vehicle (10) of any one of clauses 1 to 6, wherein: the upper frame portion (200) comprises: a left upper frame member (202), and a right upper frame member (204); the left upper frame portion (202) and the right upper frame portion (204) are fastened together along a longitudinal centerline (3) of the vehicle (10).

CLAUSE 8. The vehicle (10) of any one of clauses 1 to 7, wherein: the at least one front suspension system (70) is two front suspension systems (70); the at least one front ground engaging member (14) is two front ground engaging members (14); and a front portion (302) of the lower frame portion (300) includes: a plurality of suspension mounts (330, 340) for connecting the two front suspension systems (70) thereto, the plurality of suspension mounts (330, 340) including: at least two mounts (330) for connecting two pivoting arms (72, 74) of the two front suspension systems (70), and at least two mounts (340) for connecting two shock absorbers (76) of the two front suspension systems (70).

CLAUSE 9: The vehicle (10) of any one of clauses 1 to 8, wherein: the upper frame portion (200) extends over a top of the power pack (190); and the upper frame portion (200) is connected to the lower frame portion (300) near a front of the power pack (190) and behind the power pack (190).

CLAUSE 10. The vehicle (10) of any one of clauses 1 to 9, wherein: the upper frame portion (200) is selectively fastened to the lower frame portion (300) by a plurality of fasteners; upon removal of at least some of the plurality of fasteners, the upper frame portion (200) is upwardly pivotable with respect to the lower frame portion (300); and when the upper frame portion (200) has been pivoted upward with respect to the lower frame portion (300), a rear side of the power pack (190) is accessible.

CLAUSE 11: The vehicle (10) of any one of clauses 1 to 10, wherein: the upper frame portion (200) includes a seat portion (250); the at least one seat (20) is connected to the seat portion (250) of the upper frame portion (200); and the lower frame portion (300) extends rearward below seat portion (250) for supporting the at least one seat (20) and the seat portion (250) of the upper frame portion (200).

CLAUSE 12. The vehicle (10) of any one of clauses 1 to 11, further comprising at least one headlight (24) connected to the upper frame portion (200); and wherein the upper frame portion (200) defines at least one recess (224) for receiving the at least one headlight (24).

CLAUSE 13. The vehicle (10) of any one of clauses 1 to 12, further comprising a storage bin (17) supported by the upper frame portion (200).

CLAUSE 14. The vehicle (10) of any one of clauses 1 to 13, further comprising a gas tank (60) connected to and supported by the upper frame portion (200).

CLAUSE 15. The vehicle (10) of any one of clauses 1 to 14, further comprising a muffler (450) connected to and supported by the lower frame portion (300).

CLAUSE 16. The vehicle (10) of any one of clauses 1 to 15, further comprising at least one foot rest (26) connected to the lower frame portion (300).

CLAUSE 17. The vehicle (10) of any one of clauses 1 to 16, further comprising a radiator (52) connected to and supported by a forward portion of the lower frame portion (300).

CLAUSE 18: The vehicle (10) of any one of clauses 1 to 17, wherein the power pack (190) is connected to the lower frame portion (300) by a plurality of vibration absorbing mounts (130, 132).

CLAUSE 19: The vehicle (10) of any one of clauses 1 to 18, further comprising a plurality of body panels (15) connected to the upper frame portion (200).

CLAUSE 20: The vehicle (10) of any one of clauses 1 to 19, wherein the first material is a metal and the lower frame portion (300) comprises a plurality of lower frame members welded together.

CLAUSE 21: The vehicle (10) of any one of clauses 1 to 20, wherein the upper frame portion (200) comprises a plurality of molded upper frame members (202, 204) fastened together.

CLAUSE 22: The vehicle (10) of clause 21, wherein the second material is at least in part a thermoplastic.

CLAUSE 23: The vehicle (10) of any one of clauses 1 to 22, wherein a yield strength of the first material is at least ten times a yield strength of the second material.

CLAUSE 24: The vehicle (10) of any one of clauses 1 to 23, wherein a Young's modulus of the first material is at least twenty times a Young's modulus of the second material.

CLAUSE 25: The vehicle (10) of clause 24, wherein the Young's modulus of the first material is at least fifty times the Young's modulus of the second material.

CLAUSE 26: The vehicle (10) of any one of clauses 1 to 25, wherein a Poisson's ratio of the second material is at least 1.3 times a Poisson's ratio of the first material.

CLAUSE 27: The vehicle (10) of any one of clauses 1 to 26, wherein a density of the first material is at least 2.5 times a density of the second material.

CLAUSE 28: The vehicle (10) of clause 26, wherein the density of the first material is at least 7.5 times the density of the second material.

CLAUSE 29: The vehicle (10) of any one of clauses 1 to 28, wherein the at least one front suspension system and the at least one rear suspension system are connected to the lower frame portion (300) via load bearing mounts.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame comprising:
      a lower frame portion made from a first material, and
      an upper frame portion connected to the lower frame portion, the upper frame portion being made from a second material different from the first material,
      a center of gravity of the upper frame portion being above a center of gravity of the lower frame portion;
   two front suspension systems connected to the lower frame portion;
   two front ground engaging members, each ground engaging member being operatively connected to one of the front suspension systems;
   at least one rear suspension system connected to the lower frame portion;
   at least one rear ground engaging member operatively connected to the at least one rear suspension system;
   a power pack for providing power to at least one of:
      the at least one front ground engaging member, and
      the at least one rear ground engaging member,
   the power pack being connected to and supported by the lower frame portion;
   at least one seat connected to and supported by at least one of the upper frame portion and the lower frame portion; and
   at least one body panel connected to and supported by the upper frame portion,
   a front portion of the lower frame portion including:
      a plurality of suspension mounts for connecting the two front suspension systems thereto, the plurality of suspension mounts including:
         at least two mounts for connecting two pivoting arms of the two front suspension systems, and
         at least two mounts for connecting two shock absorbers of the two front suspension systems.

2. The vehicle of claim 1, wherein the first material has a higher density then the second material.

3. The vehicle of claim 2, wherein a density of the first material is at least 2.5 times a density of the second material.

4. The vehicle of claim 3, wherein the density of the first material is at least 7.5 times the density of the second material.

5. The vehicle of claim 1, wherein a center of gravity of the power pack is above the center of gravity of the lower frame portion.

6. The vehicle of claim 1, further comprising:
   a steering system operatively connected to the ground engaging members for steering the vehicle, the steering system comprising:
      a steering column rotatably supported by the upper frame portion.

7. The vehicle of claim 6, wherein:
   the steering column is rotatably connected to the upper frame portion at an upper portion of the steering column;
   a bottom portion of the steering column is pivotably connected to the lower frame portion; and
   the steering column extends upward and rearward from the bottom end of the steering column to the upper portion of the steering column.

8. The vehicle of claim 1, wherein:
   the power pack comprises:
      an internal combustion engine, and
      a transmission system; and
   the internal combustion engine and the transmission system are rigidly connected to each other.

9. The vehicle of claim 1, wherein:
the upper frame portion extends over a top of the power pack; and
the upper frame portion is connected to the lower frame portion near a front of the power pack and behind the power pack.

10. The vehicle of claim 1, wherein:
the upper frame portion is selectively fastened to the lower frame portion by a plurality of fasteners;
upon removal of at least some of the plurality of fasteners, the upper frame portion is upwardly pivotable with respect to the lower frame portion; and
when the upper frame portion has been pivoted upward with respect to the lower frame portion, a rear side of the power pack is accessible.

11. The vehicle of claim 1, wherein:
the upper frame portion includes a seat portion;
the at least one seat is connected to the seat portion of the upper frame portion; and
the lower frame portion extends rearward below seat portion for supporting the at least one seat and the seat portion of the upper frame portion.

12. The vehicle of claim 1, further comprising a radiator connected to and supported by a forward portion of the lower frame portion.

13. The vehicle of claim 1, wherein the power pack is connected to the lower frame portion by a plurality of vibration absorbing mounts.

14. The vehicle of claim 1, further comprising a plurality of body panels connected to the upper frame portion.

15. The vehicle of claim 1, wherein the first material is a metal and the lower frame portion comprises a plurality of lower frame members welded together.

16. The vehicle of claim 1, wherein the upper frame portion comprises a plurality of molded upper frame members fastened together.

17. The vehicle of claim 1, wherein a yield strength of the first material is at least ten times a yield strength of the second material.

18. The vehicle of claim 1, wherein a Young's modulus of the first material is at least twenty times a Young's modulus of the second material.

19. The vehicle of claim 18, wherein the Young's modulus of the first material is at least fifty times the Young's modulus of the second material.

20. The vehicle of claim 1, wherein a Poisson's ratio of the second material is at least 1.3 times a Poisson's ratio of the first material.

21. The vehicle of claim 1, wherein a highest vertical point of the lower frame portion is lower than a highest vertical point of the upper frame portion.

22. A vehicle comprising:
a frame comprising:
a lower frame portion made from a first material, and
an upper frame portion connected to the lower frame portion, the upper frame portion being made from a second material different from the first material,
a center of gravity of the upper frame portion being above a center of gravity of the lower frame portion;
at least one front suspension system connected to the lower frame portion;
at least one front ground engaging member, the at least one ground engaging member being operatively connected to the at least one front suspension system;
at least one rear suspension system connected to the lower frame portion;
at least one rear ground engaging member operatively connected to the at least one rear suspension system;
a power pack for providing power to at least one of:
the at least one front ground engaging member, and
the at least one rear ground engaging member,
the power pack being connected to and supported by the lower frame portion;
at least one seat connected to and supported by at least one of the upper frame portion and the lower frame portion;
at least one body panel connected to and supported by the upper frame portion; and
at least one headlight connected to the upper frame portion,
the upper frame portion comprising a plurality of molded upper frame members fastened together; and
the upper frame portion defining at least one recess for receiving the at least one headlight.

* * * * *